(12) United States Patent
Sakakura

(10) Patent No.: US 7,697,016 B2
(45) Date of Patent: Apr. 13, 2010

(54) IMAGE DISPLAY DEVICE, IMAGE DISPLAY METHOD, IMAGE DISPLAY PROGRAM, AND COMPUTER-READABLE STORAGE MEDIUM

(75) Inventor: Kentaro Sakakura, Yamatokoriyama (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 436 days.

(21) Appl. No.: 11/664,301

(22) PCT Filed: Aug. 11, 2005

(86) PCT No.: PCT/JP2005/014758

§ 371 (c)(1),
(2), (4) Date: Mar. 29, 2007

(87) PCT Pub. No.: WO2006/038379

PCT Pub. Date: Apr. 13, 2006

(65) Prior Publication Data

US 2008/0084430 A1 Apr. 10, 2008

(30) Foreign Application Priority Data

Sep. 30, 2004 (JP) ............................. 2004-288658

(51) Int. Cl.
*G09G 5/00* (2006.01)

(52) U.S. Cl. ..................... 345/649; 345/659; 345/441; 382/151; 382/289; 382/296; 396/329; 358/488; 358/518; 358/587

(58) Field of Classification Search ................. 345/649, 345/441, 659; 348/E13.033; 358/518, 527, 358/1.9, 488; 382/296, 151, 289, 286; 396/429
See application file for complete search history.

(56) References Cited

U.S. PATENT DOCUMENTS 6,433,896 B1 * 8/2002 Ueda et al. .................. 358/488

(Continued)

FOREIGN PATENT DOCUMENTS

| JP | 01-184526 A | 7/1989 |
| JP | 9-153143 A | 6/1997 |
| JP | 11-109940 A | 4/1999 |
| JP | 2001-265309 A | 9/2001 |

*Primary Examiner*—Kimbinh T Nguyen
(74) *Attorney, Agent, or Firm*—Birch, Stewart, Kolasch & Birch, LLP

(57) ABSTRACT

An image display device (1) of the present invention is an image display device having a function of rotating a display image, the image display device including: a size comparison section (17) for making a comparison (i) between a vertical length of an outer edge of a display region in which the display image is displayed and a vertical length of the display image and (ii) between a horizontal length of the outer edge of the display region in which the display image is displayed and a horizontal length of the display image; and a center-point-of-rotation determination section (18) for determining a center point of rotation of the display image in accordance with a result of the comparison made by the size comparison section (17). This makes it possible to provide a display device (i) which minimizes, regardless of how a display frame and a display image are related in position and size to each other, a portion of the display image which portion is to be hidden when the display image has been rotated and (ii) which can be easily employed in a rotation process.

7 Claims, 15 Drawing Sheets

U.S. PATENT DOCUMENTS 6,611,631 B1 * 8/2003 Blair et al. .................. 382/296
6,711,304 B2 * 3/2004 White ........................ 382/289
7,013,039 B2 * 3/2006 Sugawara ................... 382/151
7,196,818 B2 * 3/2007 Narushima et al. ........... 358/1.9

* cited by examiner

ENLARGEMENT

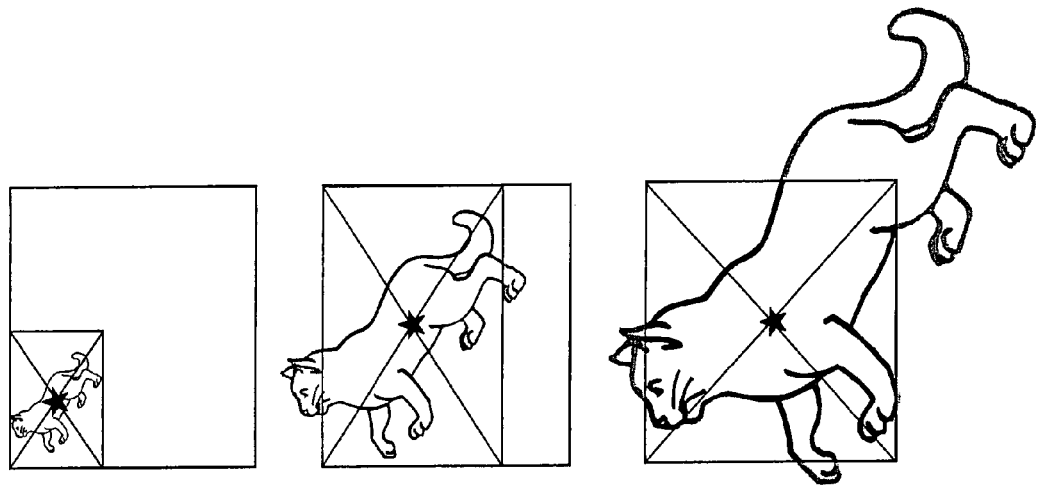
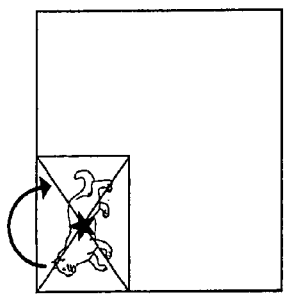
FIG. 19(a)
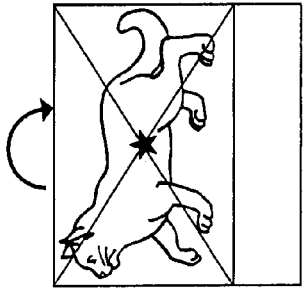
FIG. 19(b)
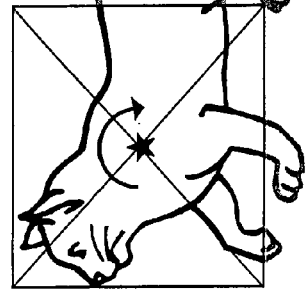
FIG. 19(c)

IMAGE DISPLAY DEVICE, IMAGE DISPLAY METHOD, IMAGE DISPLAY PROGRAM, AND COMPUTER-READABLE STORAGE MEDIUM

TECHNICAL FIELD

The present invention relates to an image display devices having a function of rotating a display image.

BACKGROUND ART

Generally, a display device that displays an image and/or a figure has a function of rotating a display image so that a user can easily see the display image. In such a display device, a given point is determined as a center point of rotation, and a display image is rotated on the point.

For example, Publicly-known Document 1 (Japanese Unexamined Patent Application No. 184526/1989 (Tokukaihei 1-184526; published on Jul. 24, 1989) discloses an arrangement in which a point at the upper left or lower right of a display screen is set as a center point of rotation, i.e., an arrangement in which a center point of rotation is fixed.

Further, Publicly-known Document 2 (Japanese Unexamined Patent Application No. 109940/1999 (Tokukaihei 11-109940; published on Apr. 23, 1999) discloses an arrangement in which a user designates a center point of rotation by using a pointing device.

However, in the arrangement disclosed in Publicly-known Document 1, a display image is rotated on the center point of rotation fixed at the upper left of lower right of the display screen. Therefore, depending on how the display image is related to a display frame, the display image may greatly protrude from the display frame. That is, the rotation may cause a large portion of the display image to be hidden.

Further, the arrangement disclosed in Publicly-known Document 2 presupposes the use of a pointing device. Therefore, an apparatus having no pointing device requires a large amount of labor in designating a central location of rotation, and therefore is inconvenient to use. Further, since the user is required to specify a center point of rotation, the user bears a great burden. That is, this makes it difficult for the user to carry out a rotation process.

DISCLOSURE OF INVENTION

The present invention has been made in view of the foregoing problems, and it is an object of the present invention to provide a display device which minimizes, regardless of how a display frame and a display image are related in position and size to each other, a portion of the display image which portion is hidden when the display image has been rotated and which can be easily employed in a rotation process.

In order to solve the foregoing problems, an image display device according to the present invention is an image display device having a function of rotating a display image, the image display device, including: comparison means for making a comparison (i) between a vertical length of an outer edge of a display region in which the display image is displayed and a vertical length of the display image and (ii) between a horizontal length of the outer edge of the display region in which the display image is displayed and a horizontal length of the display image; and determination means for determining a center point of rotation of the display image in accordance with a result of the comparison made by the comparison means.

Further, in order to solve the foregoing problems, an image display method according to the present invention is an image display method having a function of rotating a display image, the image display method, including: a comparison step of making a comparison (i) between a vertical length of an outer edge of a display region in which the display image is displayed and a vertical length of the display image and (ii) between a horizontal length of the outer edge of the display region in which the display image is displayed and a horizontal length of the display image; and a determination step of selecting a shorter one of the vertical lengths and a shorter one of the horizontal lengths in accordance with a result of the comparison made in the comparison step, and of determining, as a center point of rotation, a point of intersection between (a) a line extending perpendicularly from a given point of one of the two sides thus selected and (b) a line extending perpendicularly from a given point of the other one of the two sides thus selected.

According to the foregoing arrangement and method, the center of rotation of the display image to be rotated is found in accordance with the result of the comparison (i) between the respective vertical lengths of the outer edge of the display region in which the display image is displayed and the display image and (ii) between the respective horizontal lengths of the outer edge of the display region in which the display image is displayed and the display image. For this reason, the center point of rotation is not fixed as conventional, but can be found for each relationship between the outer edge of the display region and the display image.

This makes it possible to minimize, regardless of how the outer edge of the display region and the display image are related in size to each other, a portion of the display image which portion is hidden by moving out of the display region when the display image has been rotated.

Moreover, the center of rotation of the display image to be rotated is automatically determined in accordance with the outer edge of the display region of a display section and the display image. This makes it easy for the user to carry out a rotation process.

BRIEF DESCRIPTION OF DRAWINGS

FIG. 18(*b*) is a diagram showing an example of the image display device that represents scaling.

FIG. 19(*a*) is a diagram showing an example of how a center point of rotation is moved due to a scaling up of a display image.

FIG. 19(*b*) is a diagram showing an example of how the center point of rotation is moved due to a scaling up of the display image.

FIG. 19(*c*) is a diagram showing an example of how the center point of rotation is moved due to a scaling up of the display image.

BEST MODE FOR CARRYING OUT THE INVENTION

Embodiment 1

An embodiment of the present invention will be described below with reference to FIGS. 1 through 7.

Figure 1:
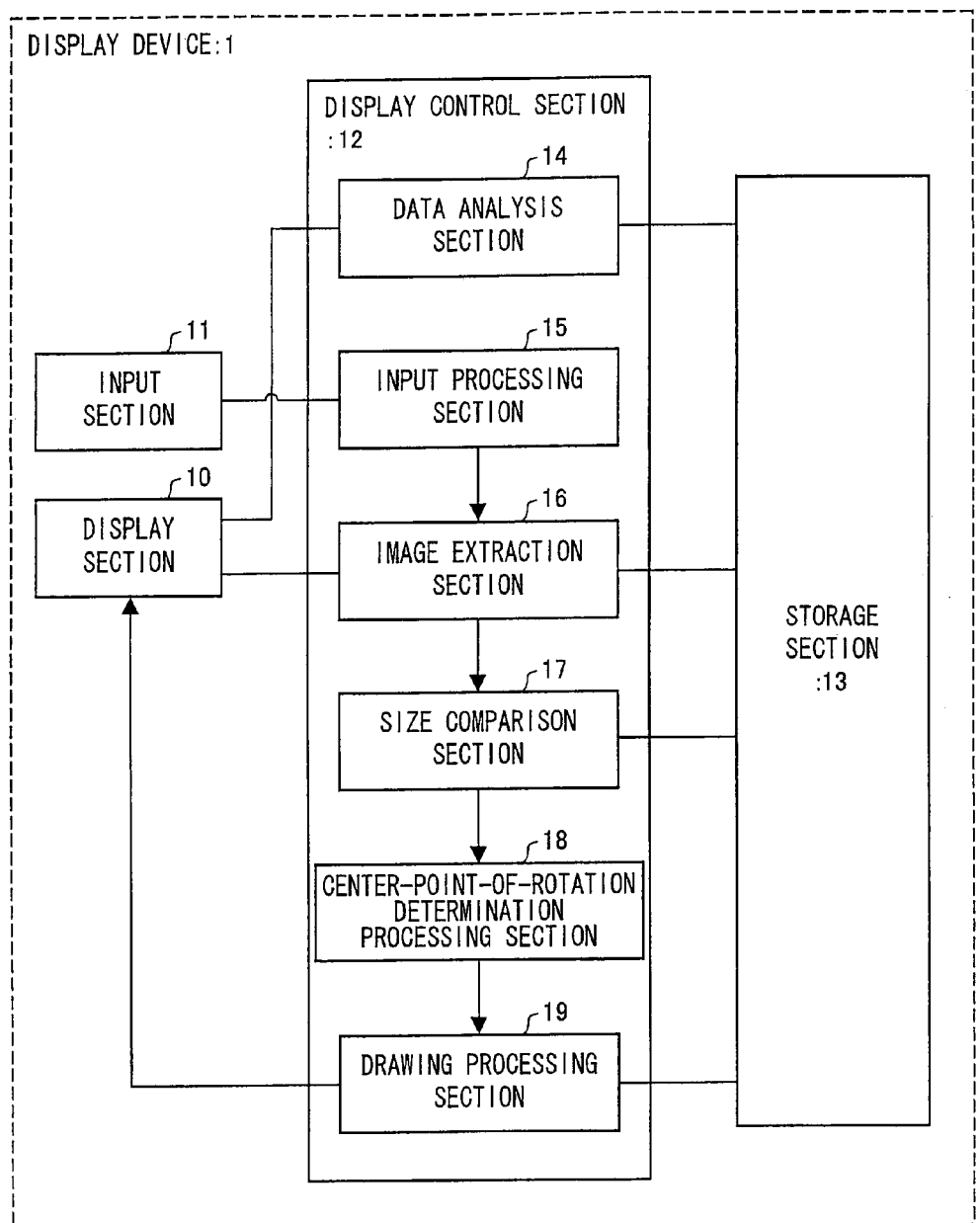
FIG. 1 shows Embodiment 1 of the present invention, and is a block diagram showing a structure of a main part of an image display device.

As shown in FIG. 1, a display device 1 according to the present invention includes a display section 10, an input section 11, a display control section 12, and a storage section 13.

Figure 2:
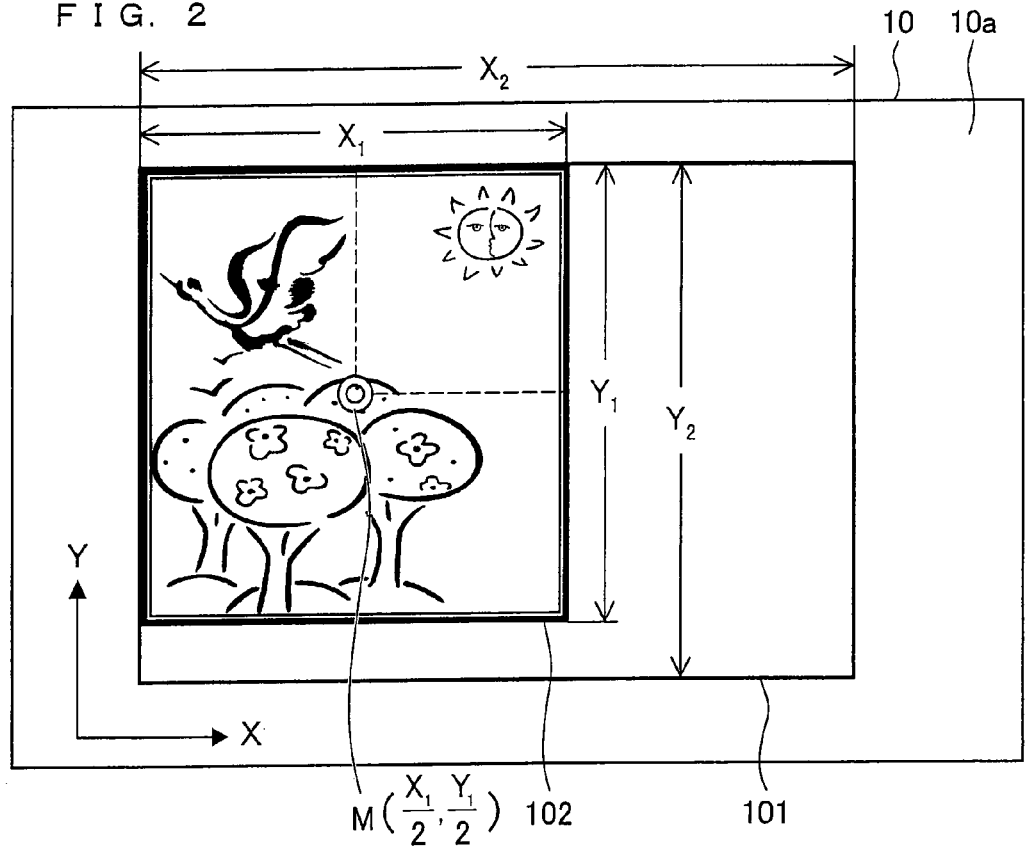
FIG. 2 is a diagram showing an example of a display section provided in the image display device in which a display image has not been rotated.

As shown in FIG. 2, the display section 10 is display means for displaying a display frame (outer edge of a display region) 101 and a display image 102 in a display feasible region 10*a*. The display section 10 is constituted by a flat display such as a liquid crystal display device. Further, the display section 10 is designed to display at least part of the display image 102 in the display frame 101 of the display feasible region 10*a*.

FIG. 2 shows a case where the display image 102 is smaller than the display frame 101. Further, FIG. 2 also shows an example in which the whole of the display image 102 is displayed in the display section 10 and in which there are margins at the positive side of the X axis direction and at the negative side of the Y axis direction.

Here, the display frame 101 refers to the outer edge of the display region in which the display image is displayed. Note that the display frame 101 may occupy the whole or part of the display feasible region 10*a* of the display section 10.

The input section 11 receives an input from a user. Specifically, the input section 11 is arranged so as to include one or more buttons. Here, in cases where the input section 11 includes one button, the display image is rotated in one direction by pressing the button. Further, in cases where the input section 11 includes two or more buttons, the display image is rotated in right and left directions. Furthermore, the angle by which an image is rotated by the input section 11 can be set optionally. In the present embodiment, for the sake of convenience, an image is rotated clockwise by 90° every time a button is pressed. Further, the input section 11 may include a dial instead of a button. In this case, the angle by which an image is rotated is determined in accordance with the angle by which the dial is turned.

As shown in FIG. 1, the display control section 12 includes a data analysis section 14, an input processing section 15, an image extraction section 16, a size comparison section 17, a center-point-of-rotation determination processing section 18, and a drawing processing section 19.

The data analysis section 14 is designed to take display frame data 104 from a display frame data storage section 24 described later, and to take display data 105 from a display data storage section 25 described later. Further, the display data 105 to be taken from the display data storage section 25 is not limited to display data normally stored in the display device, but may be data which is acquired via a communication network such as the Internet or a broadcasting network such as television broadcasting so as to be temporarily stored. Moreover, first, the data analysis section 14 analyzes the display frame data 104 and the display data 105. Next, the data analysis section 14 converts the display frame data 104 into frame data 106 in accordance with which the display section 10 displays the display frame 101, and converts the display data 105 into image data 107 in accordance with which the display section 10 displays the display image 102. Then, finally, the data analysis section 14 transmits the frame data 106 and the image data 107 to the display section 10. Here, the display frame data 104 refers to data of a frame to be displayed in the device. Further, the display data 105 refers to data, such as SVG (Scalable Vector Graphics) data or JPEG (Joint Photographic Experts Group) data, of an image to be displayed in the device. Alternatively, the display data 105 may be moving picture data such as MPEG (Moving Picture Experts Group) data or television broadcasting data. Furthermore, the frame data 106 refers to data of a display frame which data is to be transmitted to the display section 10. Further, the image data 107 refers to data of a display image which data is to be transmitted to the display section 10.

The input processing section 15 receives an input signal transmitted from the input section 11. Moreover, the input processing section 15 instructs the image extraction section 16, described later, to extract the frame data 106 of the display frame 101 currently displayed in the display section 10 and the image data 107 of the display image 102 currently displayed in the display section 10.

Upon receiving the instruction from the input processing section 15, the image extraction section 16 extracts the frame data 106 of the display frame 101 being displayed in the display section 10 and the image data 107 of the display image 102 being displayed in the display section 10. Moreover, the image extraction section 16 stores the imported frame data 106 in a display frame storage section 26, described later, which is provided in the storage section 13. Further, the image extraction section 16 stores the imported image data 107 in a display image storage section 27, described later, which is provided in the storage section 13. Furthermore, the image extraction section 16 stores vertical information of the imported frame data 106 in a display-frame vertical-information storage section 30 provided in a vertical information storage section 28 described later. Further, the image extraction section 16 stores vertical information of the imported image data 107 in a display-image vertical-information storage section 31 provided in the vertical information storage section 28 described later. Furthermore, the image extraction section 16 stores horizontal information of the imported frame data 106 in a display-frame horizontal-information storage section 32 provided in a horizontal information storage section 29 described later. Further, the image extraction section 16 stores horizontal information of the imported image data 107 in a display-image horizontal-information storage section 33 provided in the horizontal information storage section 29 described later. Note that: the vertical information is information that indicates the vertical length of the display frame 101 or display image 102; and the horizontal information is information that indicates the horizontal length of the display frame 101 or display image 102.

The size comparison section 17 makes a comparison between the respective vertical lengths of the frame data 106 and the image data 107 both imported by the image extraction section 16. Moreover, as a result of the comparison, in cases where the vertical length of the display frame 101 is shorter than the vertical length of the display image 102, the size comparison section 17 adopts, as information for determining the position of a center point of rotation M, information indicating the vertical length of the display frame 101. Further, as a result of the comparison, in cases where the vertical length of the display image 102 is shorter than the vertical length of the display frame 101, the size comparison section 17 adopts, as information for determining the position of a center point of rotation M, information indicating the vertical length of the display image 102.

The size comparison section 17 makes a comparison between the respective horizontal lengths of the frame data 106 and the image data 107 both imported by the image extraction section 16. Moreover, as a result of the comparison, in cases where the horizontal length of the display frame 101 is shorter than the horizontal length of the display image 102, the size comparison section 17 adopts, as information for determining the position of a center point of rotation M, information indicating the horizontal length of the display frame 101. Further, as a result of the comparison, in cases where the horizontal length of the display image 102 is shorter than the horizontal length of the display frame 101, the size comparison section 17 adopts, as information for determining the position of a center point of rotation M, information indicating the horizontal length of the display image 102.

Figure 4:
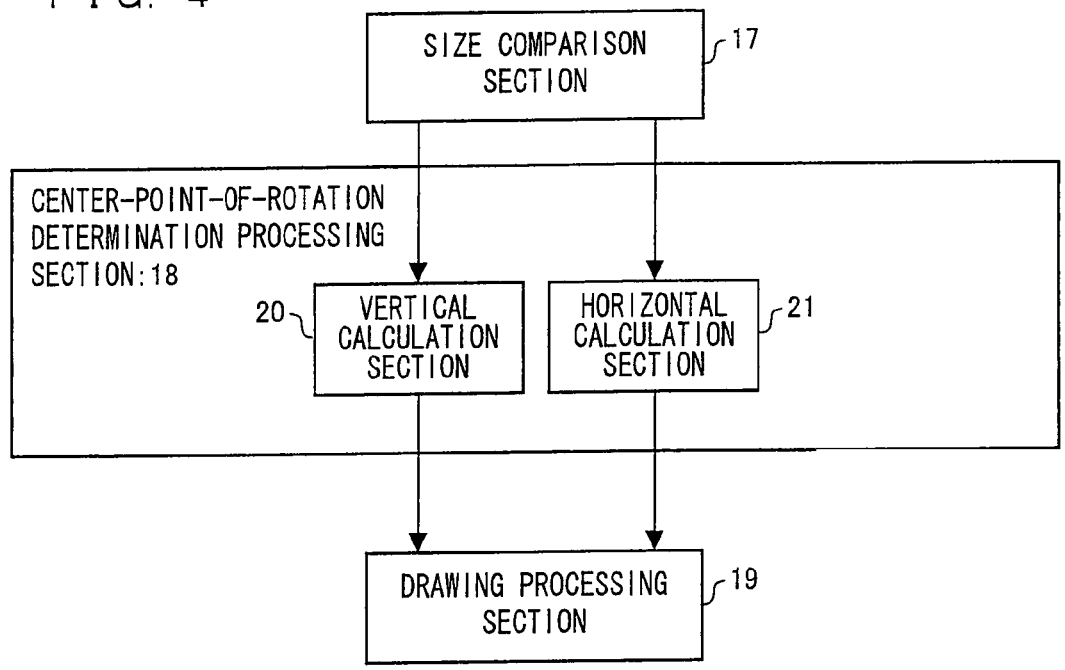
FIG. 4 is a block diagram showing a structure of a main part of determination means of the image display device.

As shown in FIG. 4, the center-point-of-rotation determination processing section 18 includes a vertical calculation section 20 and a horizontal calculation section 21.

The vertical calculation section 20 calculates a Y coordinate of the position of the center point of rotation M by using the information, adopted as a result of the comparison, which indicates the vertical length. Note that the Y coordinate means a vertical direction coordinate obtained in cases where the lower left peak of the display frame 101 or display image 102 is set as the origin.

The horizontal calculation section 21 calculates an X coordinate of the position of the center point of rotation M by using the information, adopted as a result of the comparison, which indicates the horizontal length. Note that the X coordinate means a horizontal direction coordinate obtained in cases where the lower left peak of the display frame 101 or display image 102 is set as the origin.

Figure 5:
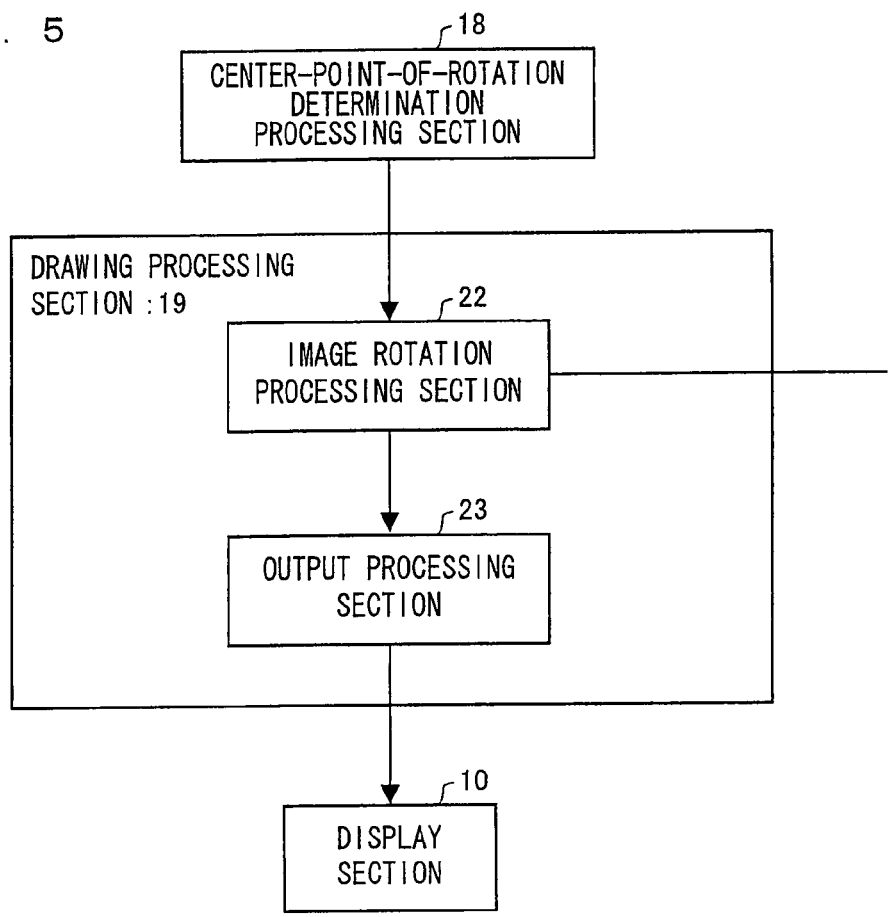
FIG. 5 is a block diagram showing a structure of a main part of a rotation process of the image display device.

As shown in FIG. 5, the drawing processing section 19 includes an image rotation processing section 22 and an output processing section 23.

The image rotation processing section 22 takes the image data 107 from the display image storage section 27. Moreover, the image rotation processing section 22 determines the center point of rotation M by using the Y coordinate calculated by the vertical calculation section 20 and the X coordinate calculated by the horizontal calculation section 21. Moreover, the image rotation processing section 22 generates image data 108 in which the display image 102 has been rotated on the center point of rotation M.

For example, as shown in FIG. 2, in cases where the X axis direction (horizontal direction) length X1 and Y axis direction (vertical direction) length Y1 of the display image 102 are shorter than the X axis direction (horizontal direction) length X2 and Y axis direction (vertical direction) length Y2 of the display frame 101, respectively, the image rotation processing section 22 sets the center point of rotation M at (X1/2, Y1/2). Moreover, the image rotation processing section 22 generates image data 108 (state shown in FIG. 3) in which the display image 102 has been rotated on the center point of rotation M by 90° to the right.

Figure 3:
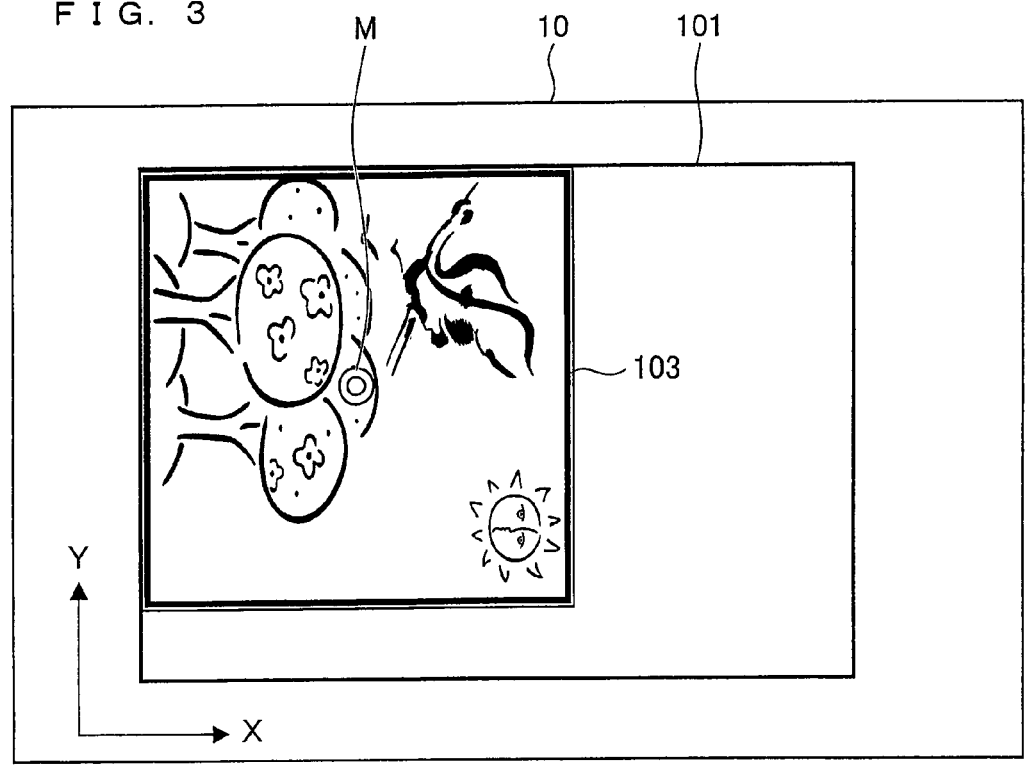
FIG. 3 is a diagram showing an example of a display section provided in the image display device in which a display image has been rotated.

The output processing section 23 transmits, to the display section 10, the image data 108 in accordance with which a display image 103 that has been rotated by the image rotation processing section 22 is displayed. Then, as shown in FIG. 3, the display section 10 displays the display image 103 that has been rotated.

Figure 6:
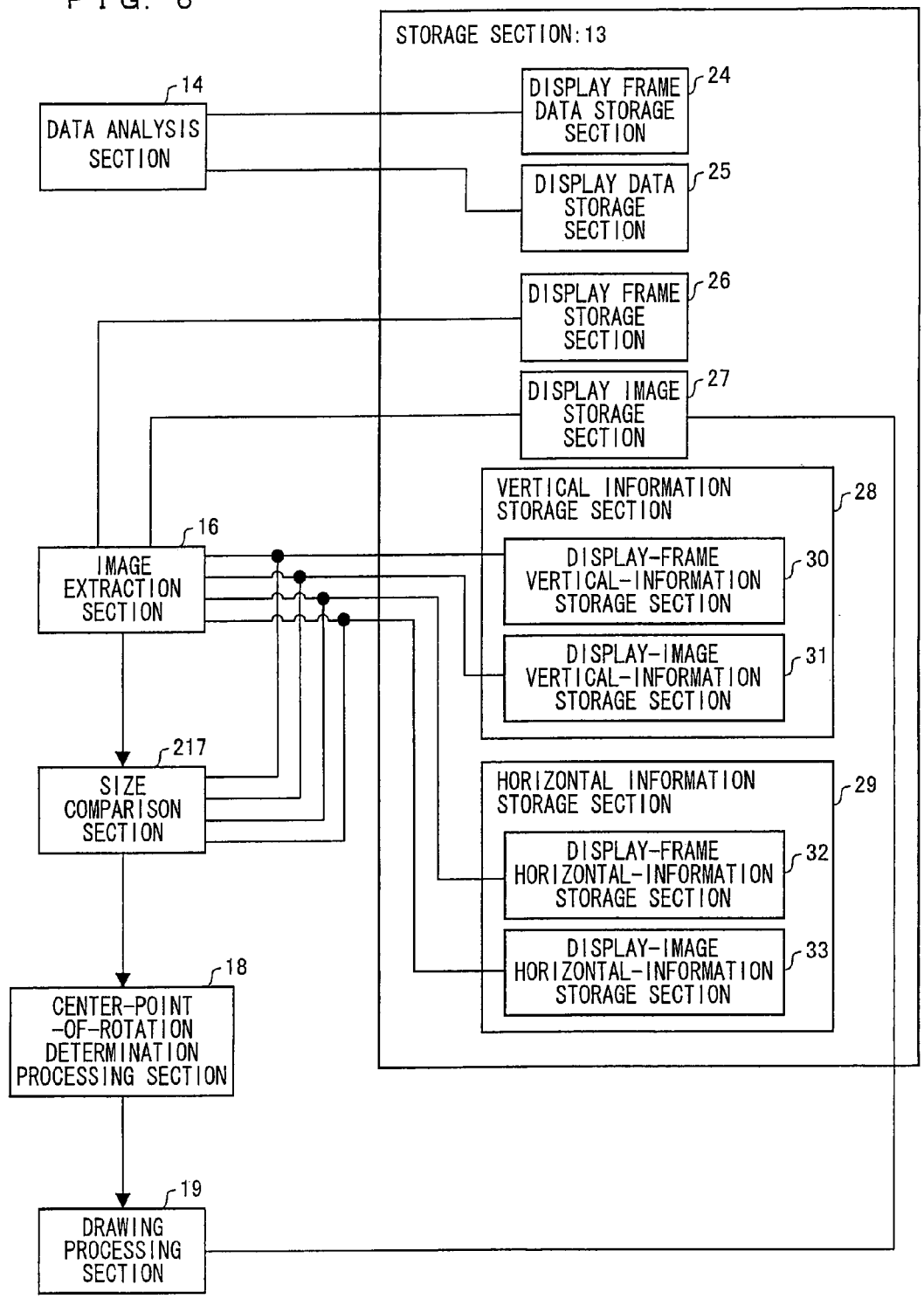
FIG. 6 is a block diagram showing a structure of a storage section of the image display device.

As shown in FIG. 6, the storage section 13 includes a display frame data storage section 24, a display data storage section 25, a display frame data storage section 26, a display image storage section 27, a vertical information storage section 28, and a horizontal information storage section 29.

In the display frame data storage section 24, the display frame data 104 is stored. Note that the display frame data storage section 24 does not need to be provided. In cases where no display frame data storage section 24 is provided, the display frame data 104 is stored in the display data storage section 25 together with the display data 105.

In the display data storage section 25, the display data 105 are stored.

In the display frame storage section 26, the frame data 106 in accordance with which the display section 10 displays the display frame 101 is stored.

In the display image storage section 27, the image data 107 in accordance with which the display section 10 displays the display image 102 is stored.

The vertical information storage section 28 includes a display-frame vertical-information storage section 30 and a display-image vertical-information storage section 31.

In the display-frame vertical-information storage section 30, the information indicating the vertical length of the display frame 101 is stored.

In the display-image vertical-information storage section 31, the information indicating the vertical length of the display image 102 is stored The horizontal information storage section 29 includes a display-frame horizontal-information storage section 32 and a display-image horizontal-information storage section 33.

In the display-frame horizontal-information storage section 32, the information indicating the horizontal length of the display frame 101 is stored.

In the display-image horizontal-information storage section 33, the information indicating the horizontal length of the display image 102 is stored.

[Process Procedures]

Figure 7:
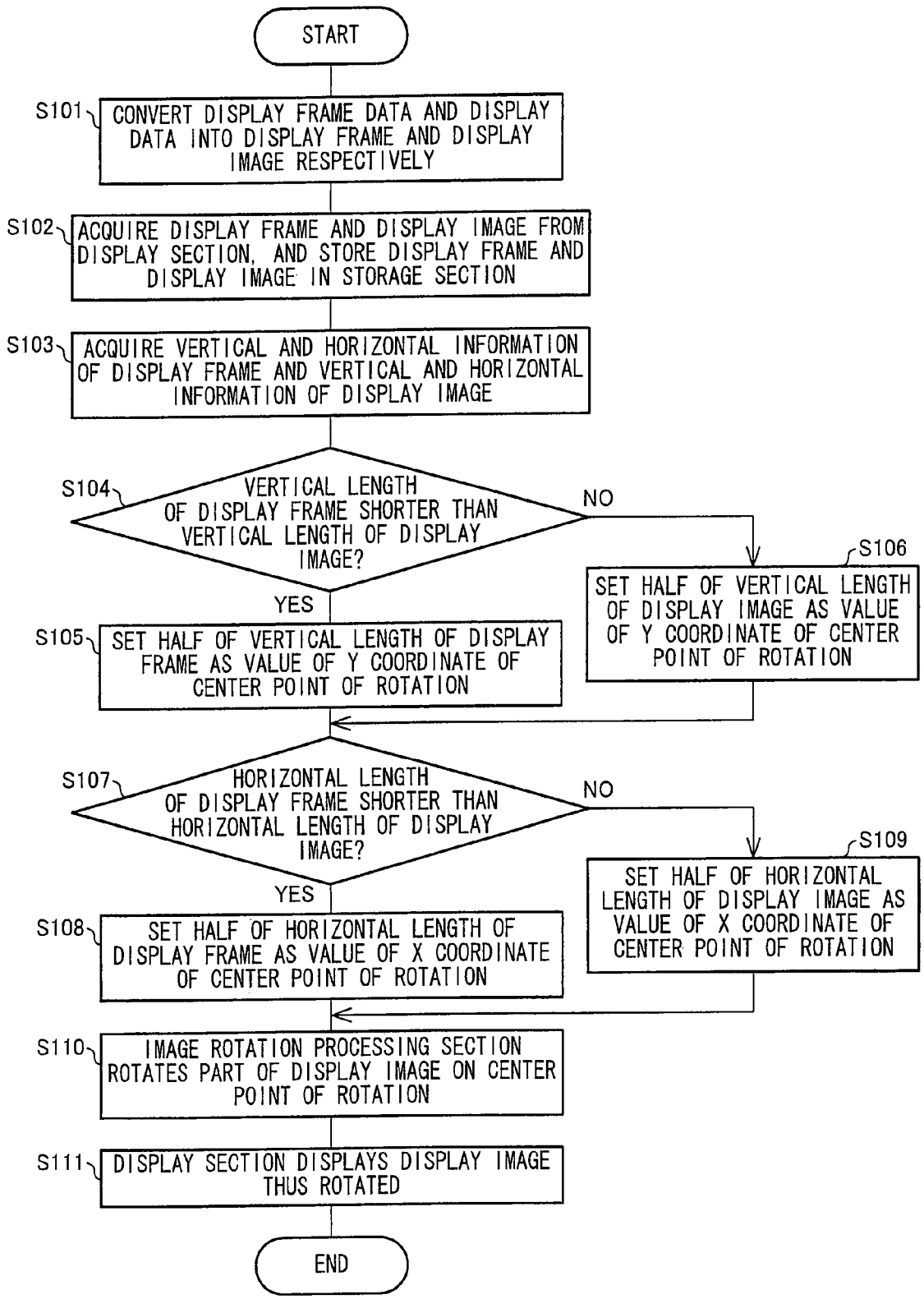
FIG. 7 is a flow chart showing a flow of a display process according to Embodiment 1.

In the following, a flow of a process to be carried out in the display device 1 of the present embodiment is explained with reference to a flow chart shown in FIG. 7.

First, in Step 101 (the word "Step" being hereinafter referred to as "S"), the data analysis section 14 takes the display frame data 104 from the display frame data storage section 24, and coverts the display frame date 104 into the frame data 106 in accordance with which the display section 10 displays the display frame 101. Further, the display analysis section 14 takes the display data 105 from the display data storage section 25, and converts the display data 105 into the image data 107 in accordance with which the display section 10 displays the display image 102. Then, the data analysis section 14 transmits the frame data 106 and the image data 107 to the display section 10. Thereafter, the process shifts to S102.

In S102, the image extraction section 16 extracts the frame data 106 and the image data 107 from the display section 10. Then, the image extraction section 16 stores the frame data 106 in the display frame storage section 26, and stores the image data 107 in the display image storage section 27. Further, the image extraction section 16 stores vertical information of the frame data 106 in the display-frame vertical-information storage section 30 provided in the vertical information storage section 28, and stores horizontal information of the frame data 106 in the display-frame horizontal-information storage section 32 provided in the horizontal information storage section 29. Further, the image extraction section 16 stores vertical information of the image data 107 in the vertical information storage section 31, and stores horizontal information of the image data 107 in the display-image horizontal-information storage section 33 provided in the horizontal information storage section 29. Thereafter, the process shifts to S103.

In S103, the size comparison section 17 acquires the vertical information of the frame data 106 and the vertical information of the image data 107 from the vertical information storage section 28. Further, the size comparison section 17 acquires the horizontal information of the frame data 106 and the horizontal information of the image data 107 from the horizontal information storage section 29. Thereafter, the process shifts to S104.

In S104, the size comparison section 17 makes a comparison between the vertical information of the frame data 106 and the vertical information of the image data 107, i.e., between the vertical length of the display frame 101 and the vertical length of the display image 102. As a result of the comparison, in cases where the vertical length of the display frame 101 is shorter than the vertical length of the display image 102, the size comparison section 17 adopts the vertical length of the display frame 101 as a Y coordinate of the position of the center point of rotation M. Thereafter, the process shifts to S105. Alternatively, as a result of the comparison, in cases where the vertical length of the display image 102 is shorter than the vertical length of the display frame 101, the size comparison section 17 adopts the vertical length of the display image 102 as a Y coordinate of the position of the center point of rotation M. Thereafter, the process shifts to S106.

In S105, the vertical calculation section 20 calculates the value of the Y coordinate from the vertical length of the display frame 101. Note that the value of the Y coordinate is a value half as great as the vertical length of the display frame 101. Thereafter, the process shifts to S107.

In S106, the vertical calculation section 20 calculates the value of the Y coordinate from the vertical length of the display image 102. Note that the value of the Y coordinate is a value half as great as the vertical length of the display image 102. Thereafter, the process shifts to S107.

In S107, the size comparison section 17 makes a comparison between the horizontal information of the frame data 106 and the horizontal information of the image data 107, i.e., between the horizontal length of the display frame 101 and the horizontal length of the display image 102. As a result of the comparison, in cases where the horizontal length of the display frame 101 is shorter than the horizontal length of the display image 102, the size comparison section 17 adopts the horizontal length of the display frame 101 as an X coordinate of the position of the center point of rotation M. Thereafter, the process shifts to S108. Alternatively, as a result of the comparison, in cases where the horizontal length of the display image 102 is shorter than the horizontal length of the display frame 101, the size comparison section 17 adopts the horizontal length of the display image 102 as an X coordinate of the position of the center point of rotation M. Thereafter, the process shifts to S109.

In S108, the horizontal calculation section 21 calculates the value of the X coordinate from the horizontal length of the display frame 101. Note that the value of the X coordinate is a value half as great as the horizontal length of the display frame 101. Thereafter, the process shifts to S110.

In S109, the horizontal calculation section 21 calculates the value of the X coordinate from the horizontal length of the display image 102. Note that the value of the X coordinate is a value half as great as the horizontal length of the display image 102. Thereafter, the process shifts to S110.

The process of calculating the vertical information in S104, S105, and S106 may be carried out after the process of calculating the horizontal information in S107, S108, and S109.

In S110, the image rotation processing section 22 determines the center point of rotation M by using the value of the Y coordinate which value has been calculated by the vertical calculation section 20 and the value of the X coordinate which value has been calculated by the horizontal calculation section 21. Then, the image rotation processing section 22 generates image data 108 in which the display image 102 has been rotated on the center point of rotation M. Thereafter, the process shifts to S111.

In S111, as shown for example in FIG. 3, the output processing section 23 transmits, to the display section 10, the image data 108 thus generated after the rotation. With this, as shown for example in FIGS. 2 and 3, the display image is rotated on the center point of rotation M indicated by a double circle.

Thus, the display device of the foregoing arrangement automatically determines, in accordance with the length of each side of the display frame 101 and the length of each side of the display image 102, the center point of rotation M of the display image 102 displayed in the display section 10. This makes it possible to minimize a portion of the display image which portion is hidden by moving out of the display region when the display image has been rotated. This allows the user to carry out an optimum rotation process.

Embodiment 1 explains a case where the input section 11 is provided. However, in Modified Example 1, an input section such as a button or a dial does not need to be provided. In cases where no such input section is provided, rotation information necessary for rotating an angle of rotation or the like is embedded in the display image 102, so that the display device 1 automatically rotates the display image 102 by using the rotation information. This allows the user to see the display image at an optimum angle without operating a button, a dial, or the like.

Further, the display device 1 may automatically rotate the display image 102 in accordance with how the display section 10 and the display image are related to each other, e.g., how the display section 10 and the display image are related in vertical length and horizontal length to each other. Specifically, for example, see a case where the display section 10 has a rectangular shape having two horizontal sides and two vertical sides that are longer than the two horizontal sides, and where the desired display image 102 has a rectangular shape having two vertical sides and two horizontal sides that are longer than the two vertical sides. In this case, even when the display device 1 displays the display image 102, only part of the desired display image 102 fits into the display section 10. Therefore, in this case, the display device 1 automatically rotates the display image 102 so that the display image 102 fits into the display section 10. With this, even when the display section 10 and the display image 102 are different in display mode from each other, the display device 1 can always display the display image 102 optimally.

Furthermore, the display device 1 may automatically rotates the display image 102 in accordance with an automatic rotation set value of the display device 1. Specifically, for example, see a case where the display section 10 has a rectangular shape having two horizontal sides and two vertical sides that are longer than the two horizontal sides. In this case, when the user has rotated the display section 10 by 90°, the display image 102 is automatically rotated in response to the rotation. With this, even in cases where the user wants to see the desired display image with its longer sides extending horizontally, the display device 1 can always display the display image 102 optimally.

Figure 18B:
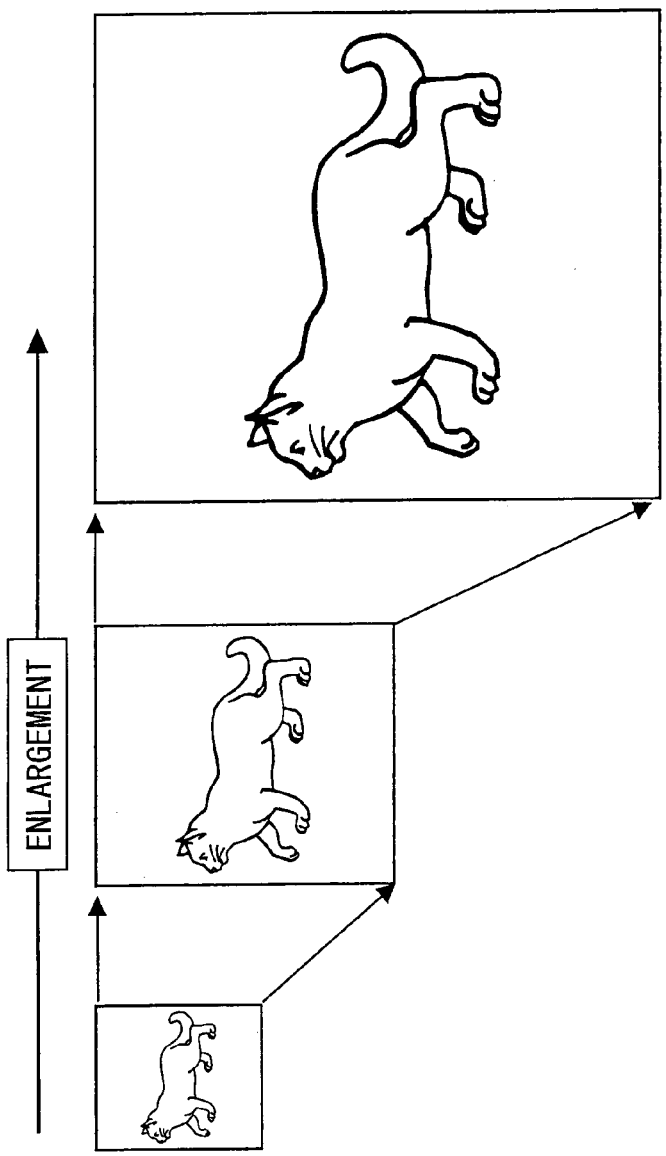
FIG. 18(*a*) is a diagram showing an example of a display section provided in the image display device in which a display image has not been scaled up or down.
Figure 18A:
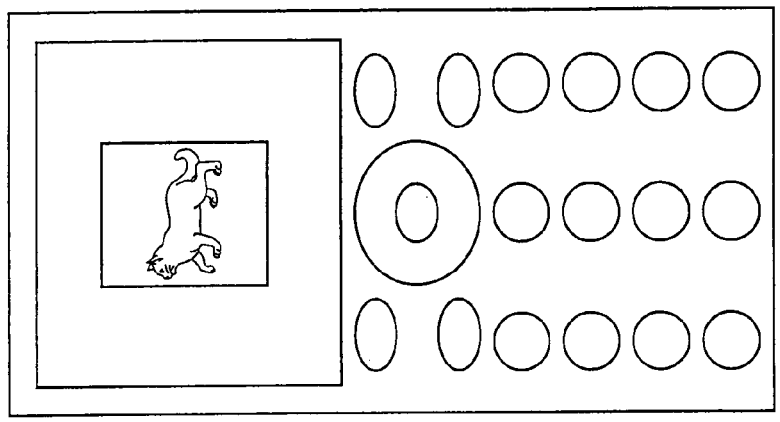

Further, in the present embodiment, the input section 11 causes the display image 102 to be rotated by pressing a button or turning a dial. However, in a modified example, the input section 11 may cause the display image 102 to be scaled up or down by pressing a button or turning a dial. In this case, the vertical and horizontal lengths of the display image that has been scaled up or down and the vertical and horizontal lengths of the outer edge of the display region in which the display image is displayed are compared with each other, respectively, and the center point of rotation of the display image is determined in accordance with a result of the comparison. For example, in cases where the display image has been scaled up, the display image becomes larger as shown in FIG. 18(b) than the display image that has not been scaled up as shown in FIG. 18(a). With this, as shown in FIGS. 19(a) through 19(c), even when scaling causes a change in the way the display frame 101 and the display image 102 are related in size to each other, the center point of rotation M is always determined in accordance with how the display frame 101 and the display image 102 are currently related in size to each other.

Further, in the present embodiment, the image extraction section 16 extracts the content of the display frame storage section 26, stores the vertical information of the display frame in the display-frame vertical-information storage section 30, and stores the horizontal information of the display frame in the display-frame horizontal-information storage section 32. However, in a modified example, the image extraction section 16 may directly calculate vertical information and horizontal information of the display frame from the display frame data 104, and may store the calculated vertical information and the calculated horizontal information in the display-frame vertical-information storage section 30 and the display-frame horizontal-information storage section 32, respectively.

Similarly, in the present embodiment, the image extraction section 16 extracts the content of the display image storage section 27, stores the vertical information of the display image in the display-image vertical-information storage section 31, and stores the horizontal information of the display image in the display-image horizontal-information storage section 33. However, in a modified example, the image extraction section 16 may directly calculate vertical information and horizontal information of the display image from the display image data 105, and may store the calculated vertical information and the calculated horizontal information in the display-image vertical-information storage section 31 and the display-image horizontal-information storage section 33, respectively.

Further, in the present embodiment, the display frame 101 and the display image 102 are displayed in the display feasible region 10a of the display section 10. However, in a modified example, the display section 10 does not need to display the display frame 101. In this case, the display frame data 104 is used solely for calculating and determining the center point of rotation, and the process of converting the display frame data 104 into the frame data 106 is omitted. In this case, the vertical information and horizontal information of the display frame are directly calculated from the display frame data 104, and are stored in the display-frame vertical-information storage section 30 and the display-frame horizontal-information storage section 32, respectively.

Embodiment 2

Another embodiment of the present invention will be described below with reference to the drawings. Components having the same functions as those described above in Embodiment 1 are given the same reference numerals, and a description thereof is omitted. A display device 2 according to the present embodiment is different in arrangement from the display device 1, shown in Embodiment 1, in terms of the display control section 12 and the storage section 13, but is identical to the display device 1 in terms of the other arrangements.

Figure 8:
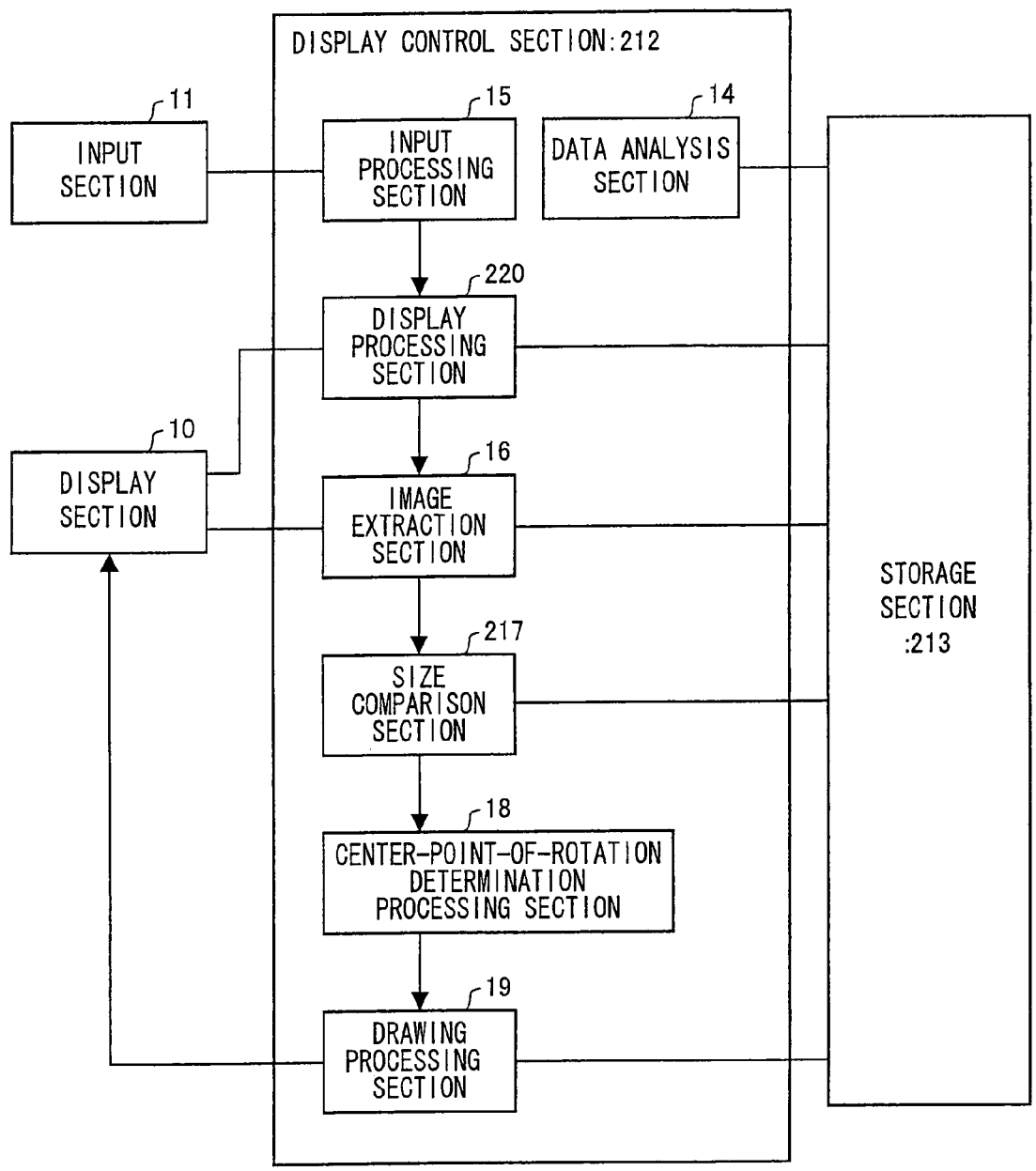
FIG. 8 shows Embodiment 2 of the present invention, and is a block diagram showing a structure of a main part of an image display device.
Figure 9:
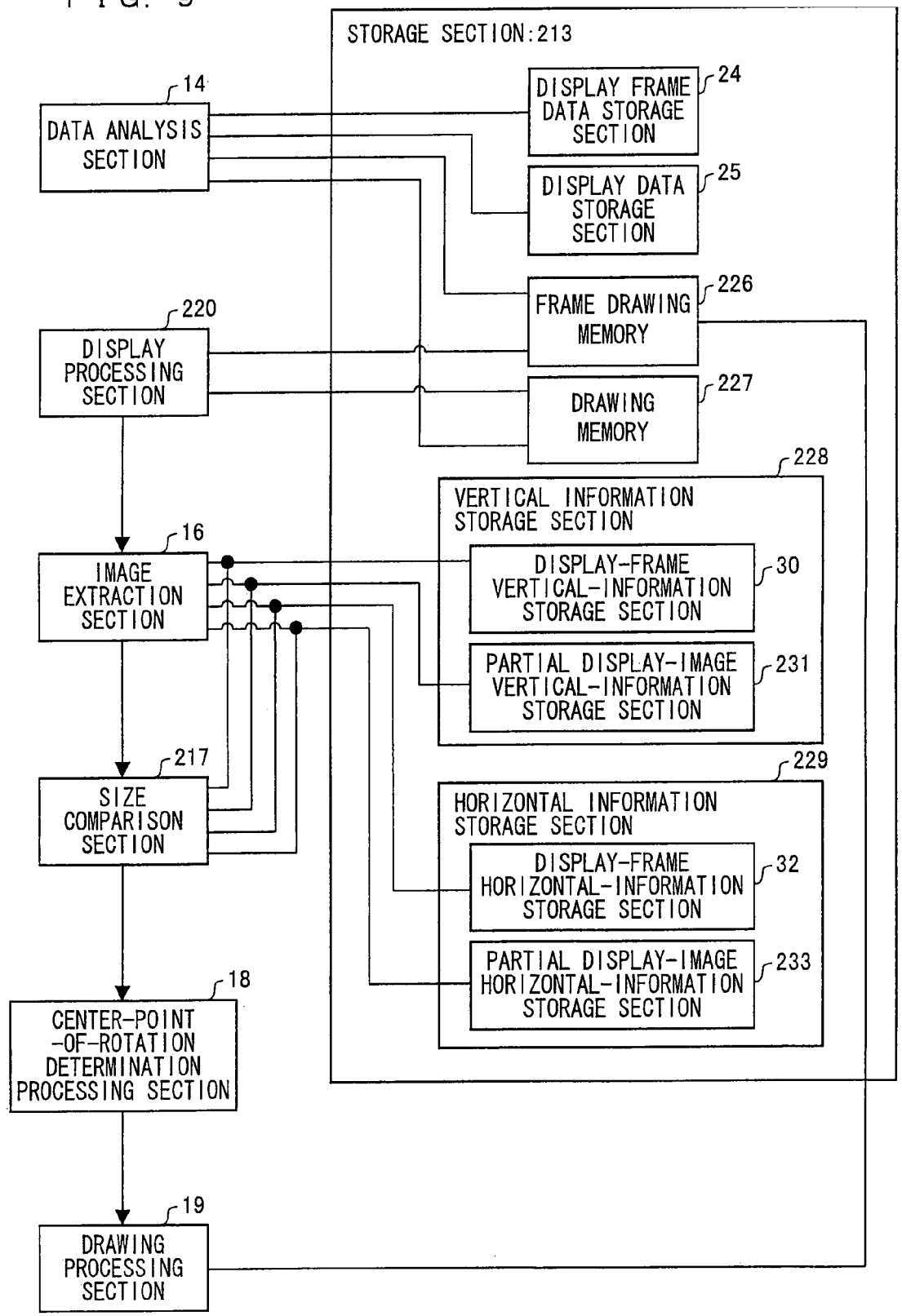
FIG. 9 is a block diagram showing a structure of a storage section of the image display device.

As shown in FIG. 8, a display control section 212 of the present embodiment is arranged by adding a display processing section 220 to Embodiment 1 described above. Further, in the present embodiment, the targets of comparison compared by the size comparison section 17 described in Embodiment 1 are changed. Furthermore, as shown in FIG. 9, a storage section 213 of the present embodiment is arranged such that the display frame storage section 26 and display image storage section 27 of Embodiment 1 described above have been replaced by a frame drawing memory 226 and a drawing memory (storage section in which a display image is stored) 227, respectively. Further, in the present embodiment, the display-image vertical-information storage section 31 and the display-image horizontal-information storage section 33 both described in Embodiment 1 are replaced by a partial display-image vertical-information storage section 231 and a partial display-image horizontal-information storage section 233.

The data analysis section 14 takes display frame data 204 from the display frame data storage section 24 described later, and takes display data 205 from the display data storage section 25 described later. Moreover, the data analysis section 14 analyzes the display frame data 204 and the display data 205, and converts the display frame data 204 and the display data 205 into frame data 206 and image data 207, respectively. Furthermore, the data analysis section 14 stores the frame data 206 and the image data 207 in the frame drawing memory 226 and the drawing memory 227 both described later, respectively.

Figure 10:
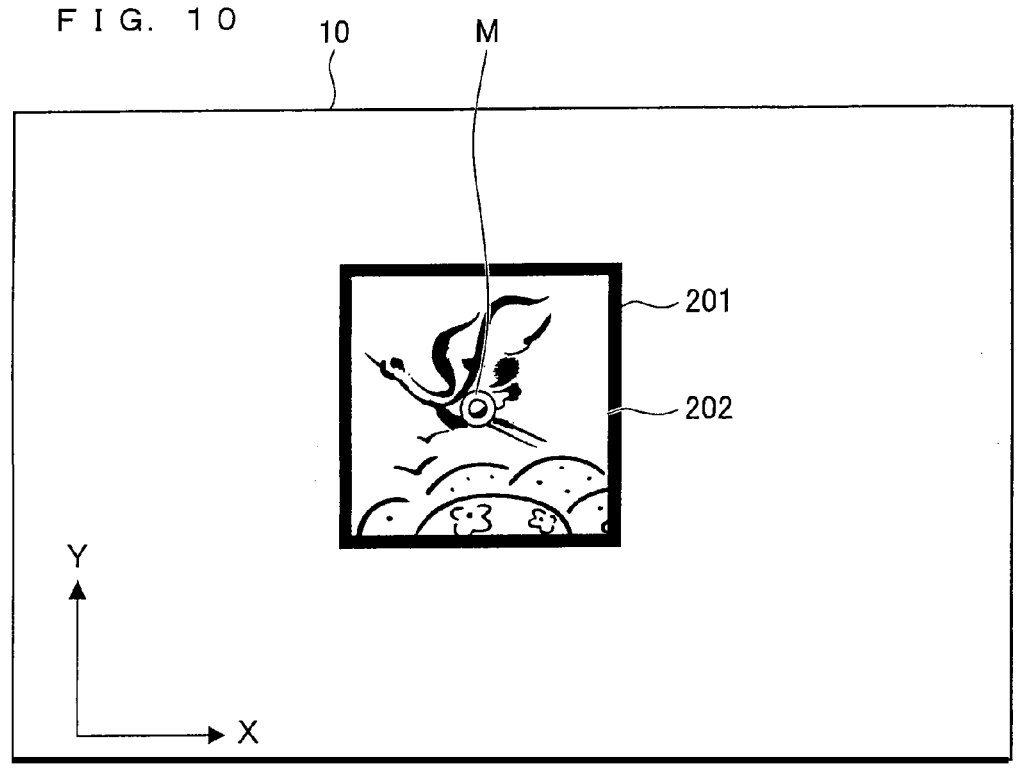
FIG. 10 is a diagram showing an example of a display section provided in the image display device in which part of a display image has not been rotated.

The display processing section 220 transmits, to the display section 10, the frame data 206 and the image data 207 respectively stored in the frame drawing memory 226 and the drawing memory 227 by the data analysis section 14. FIG. 10 shows an example of a display carried out in the display section 10. In this example, the display frame 201 is smaller than part of the display image 202 (the reference numeral "202" referring to the word "part"), and the part of the display image 202 is displayed in the display section 10. Note that the double circle shown in FIG. 10 indicates the center point of rotation M.

Further, according to the display processing section 220, the part of the display image 202 may be disposed in the center of the display frame 201, or may be disposed so that the upper left corner of the display frame 201 and the upper left corner of the part of the display image 202 overlap. Furthermore, the display 201 and the part of the display image 202 may be disposed optionally.

The size comparison section 217 makes a comparison between (i) the vertical length of the display frame 201, which vertical length has been stored in the display-frame vertical-information storage section 30 by the image extraction section 16, and (ii) the vertical length of the part of the display image 202, which vertical length has been stored in the partial display-image vertical-information storage section 231 by the image extraction section 16. Moreover, as a result of the comparison, in cases where the vertical length of the display frame 201 is shorter than the vertical length of the part of the display image 202, the size comparison section 217 adopts, as information for determining the position of the center point of rotation M, the vertical length of the display frame 201. Alternatively, as a result of the comparison, in cases where the vertical length of the part of the display image 202 is shorter than the vertical length of the display frame 201, the size comparison section 217 adopts, as information determining the position of the center point of rotation M, the vertical length of the part of the display image 202.

Furthermore, the size comparison section 217 makes a comparison between (i) the horizontal length of the display frame 201, which horizontal length has been stored in the display-frame horizontal-information storage section 32 by the image extraction section 16, and (ii) the horizontal length of the part of the display image 202, which horizontal length has been stored in the partial display-image horizontal-information storage section 233. Moreover, as a result of the comparison, in cases where the horizontal length of the display frame 201 is shorter than the horizontal length of the part of the display image 202, the size comparison section 217 adopts, as information for determining the position of the center point of rotation M, the horizontal length of the display frame 201. Alternatively, as a result of the comparison, in cases where the horizontal length of the part of the display image 202 is shorter than the horizontal length of the display frame 201, the size comparison section 217 adopts, as information determining the position of the center point of rotation M, the horizontal length of the part of the display image 202.

In the frame drawing memory 226, the frame data 206 is stored, the frame data 206 being obtained when the display frame data 204 is so converted by the data analysis section 14 as to be able to be displayed in the display section 10.

In the drawing memory 227, the image data 207 is stored, the image data 207 being obtained when the display data 205 is so converted by the data analysis section 14 as to be able to be displayed in the display section 10.

In the partial display-image vertical-information storage section 231, the vertical information of the part of the display image 202 is stored.

In the partial display-image horizontal-information storage section 233, the horizontal information of the part of the display image 202 is stored.

[Process Procedures]

Figure 12:
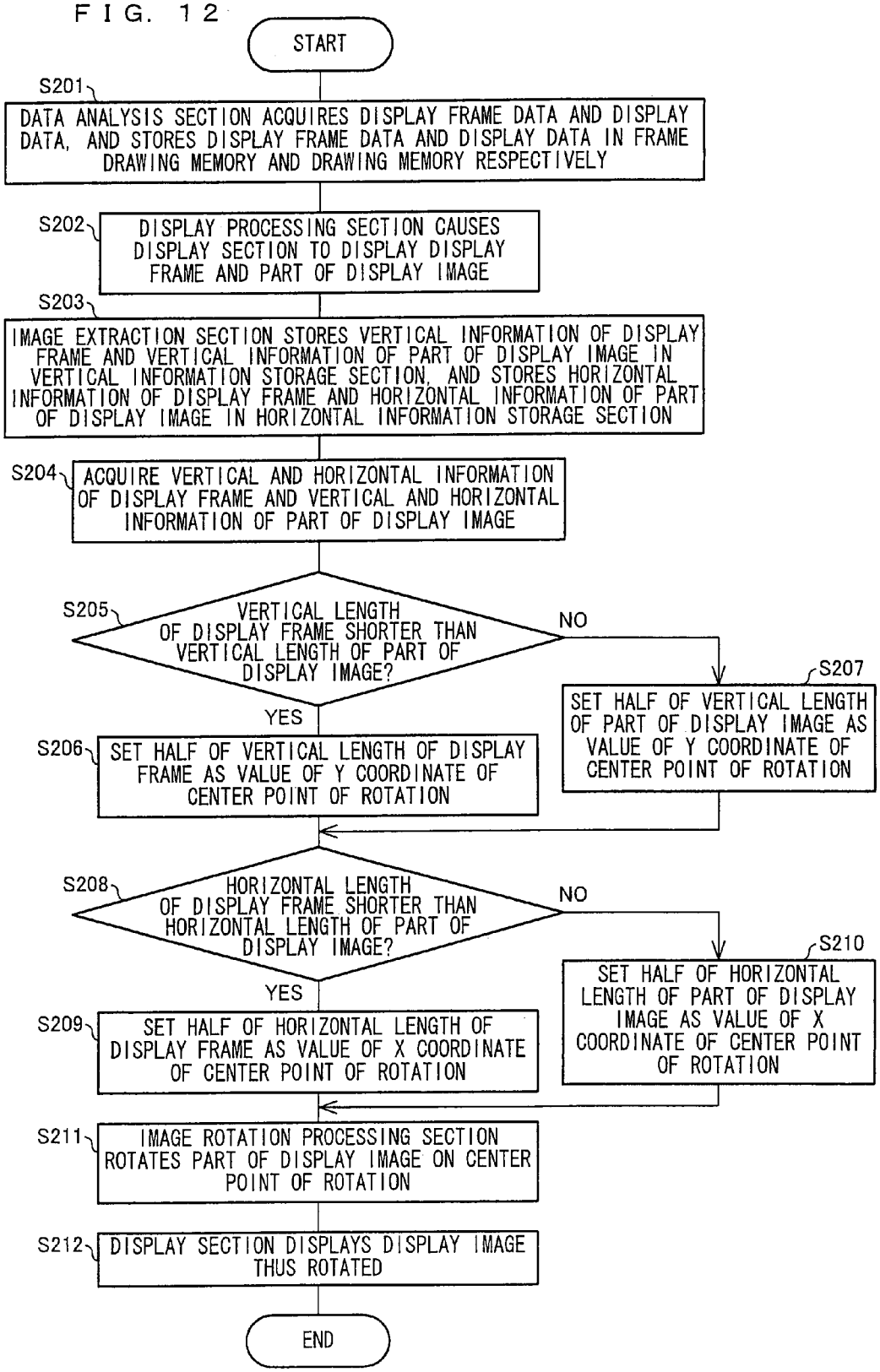
FIG. 12 is a flow chart showing a flow of a display process according to Embodiment 2.
Figure 13:
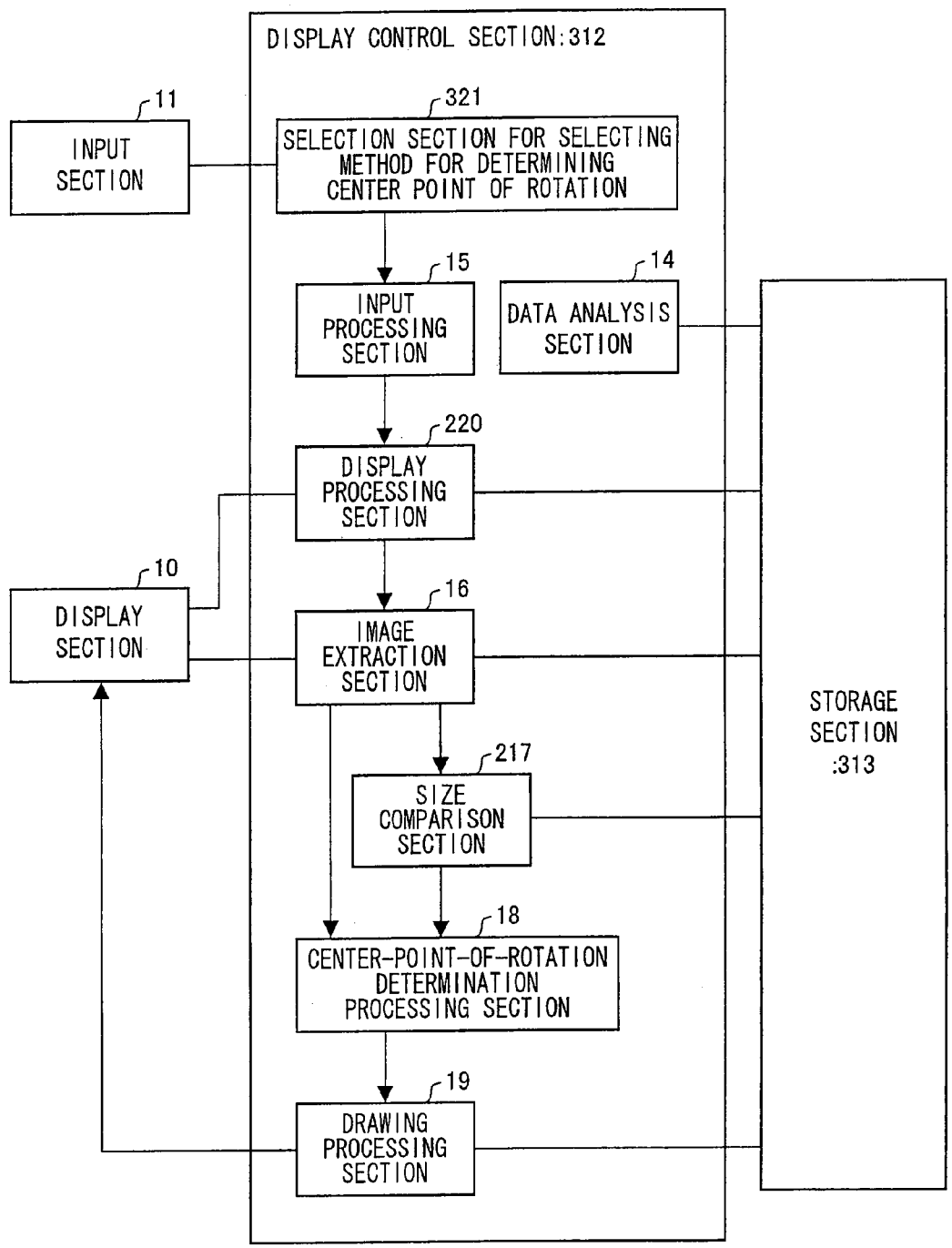
FIG. 13 is a flow chart showing a flow of a display process according to Embodiment 2.

In the following, a flow of a process to be carried out in the display device 2 of the present embodiment is explained with reference to a flow chart shown in FIG. 12.

First, in S201, the data analysis section 14 takes the display frame data 204 from the display frame data storage section 24, and converts the display frame data 204 into frame data 206. Then, the data analysis section 14 stores the frame data 206 in the frame drawing memory 226. Further, the data analysis section 14 takes the display data 205 from the display data storage section 25, and converts the display data 205 into image data 207. Then, the data analysis section 14 stores the image data 207 in the drawing memory 227. Thereafter, the process shifts to S202.

In S202, the display processing section 220 takes the frame data 206 from the frame drawing memory 226, and transmits the frame data 206 to the display section 10. Further, the display processing section 220 takes the image data 207 from the drawing memory 227, and transmits the image data 207 to the display section 10. Thereafter, the process shifts to S203.

In S203, the image extraction section 16 extracts the frame data 206 and the image data 207 from the display section 10. Then, the image extraction section 16 stores vertical information of the frame data 206 in the display-frame vertical-information storage section 30 provided in a vertical information storage section 228, and stores horizontal information of the frame data 206 in the display-frame horizontal-information storage section 32 provided in a horizontal information storage section 229. Furthermore, the image extraction section 16 stores vertical information of the image data 207 in the partial display-image vertical-information storage section 231 provided in the vertical information storage section 228, and stores horizontal information of the image data 207 in the partial display-image horizontal-information storage section 233 provided in the horizontal information storage section 229. Thereafter, the process shifts to S204.

In S204, the size comparison section 217 acquires the vertical information of the frame data 206 and the vertical information of the image data 207 from the vertical information storage section 228. Further, the size comparison section 217 acquires the horizontal information of the frame date 206 and the horizontal information of the image data 207 from the horizontal information storage section 229. Thereafter, the process shifts to S205.

In S205, the size comparison section 217 makes a comparison between the vertical information of the frame data 206 and the vertical information of the image data 207, i.e., between the vertical length of the display frame 201 and the vertical length of the part of the display image 202. As a result of the comparison, in cases where the vertical length of the display frame 201 is shorter than the vertical length of the part of the display image 202, the size comparison section 217 adopts the vertical length of the display frame 201 as a Y coordinate of the position of the center point of rotation M. Thereafter, the process shifts to S206. Alternatively, as a result of the comparison, in cases where the vertical length of the part of the display image 202 is shorter than the vertical length of the display frame 201, the size comparison section 217 adopts the vertical length of the part of the display image 202 as a Y coordinate of the position of the center point of rotation M. Thereafter, the process shifts to S207.

In S206, the vertical calculation section 20 calculates the value of the Y coordinate from the vertical length of the display frame 201. Note that the value of the Y coordinate is a value half as great as the vertical length of the display frame 201. Thereafter, the process shifts to S208.

In S207, the vertical calculation section 20 calculates the value of the Y coordinate from the vertical length of the part of the display image 202. Note that the value of the Y coordinate is a value half as great as the vertical length of the part of the display image 202. Thereafter, the process shifts to S208.

In S208, the size comparison section 217 makes a comparison between the horizontal information of the frame data 206 and the horizontal information of the image data 207, i.e., between the horizontal length of the display frame 201 and the horizontal length of the part of the display image 202. As a result of the comparison, in cases where the horizontal length of the display frame 201 is shorter than the horizontal length of the part of the display image 202, the size comparison section 217 adopts the horizontal length of the display frame 201 as an X coordinate of the position of the center point of rotation M. Thereafter, the process shifts to S210. Alternatively, as a result of the comparison, in cases where the horizontal length of the part of the display image 202 is shorter than the horizontal length of the display frame 201, the size comparison section 217 adopts the horizontal length of the part of the display image 202 as an X coordinate of the position of the center point of rotation M. Thereafter, the process shifts to S210.

In S209, the horizontal calculation section 21 calculates the value of the X coordinate from the horizontal length of the display frame 201. Note that the value of the X coordinate is a value half as great as the horizontal length of the display frame 201. Thereafter, the process shifts to S211.

In S210, the horizontal calculation section 21 calculates the value of the X coordinate from the horizontal length of the part of the display image 202. Note that the value of the X coordinate is a value half as great as the horizontal length of the part of the display image 202. Thereafter, the process shifts to S211.

The process of calculating the vertical information in S205, S206, and S2076 may be carried out after the process of calculating the horizontal information in S2087, S209, and S210.

In S211, the image rotation processing section 22 determines the center point of rotation M by using the value of the Y coordinate which value has been calculated by the vertical calculation section 20 and the value the X coordinate which value has been calculated by the horizontal calculation section 21. Then, the image rotation processing section 22 generates image data 208 in which the part of the display image 202 has been rotated on the center point of rotation M. Thereafter, the process shifts to S212.

Figure 11:
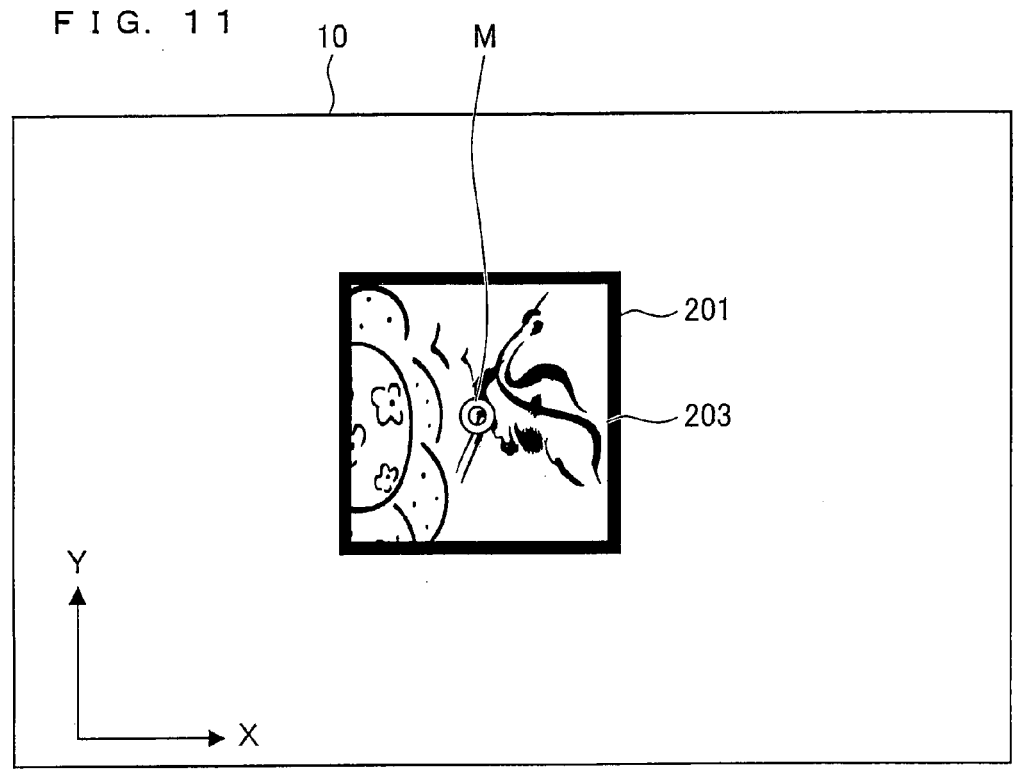
FIG. 11 is a diagram showing an example of a display section provided in the image display device in which part of a display image has been rotated.

In S212, as shown for example in FIG. 11, the output processing section 23 transmits, to the display section 10, the image data 208 thus generated after the rotation. With this, as shown for example in FIGS. 10 and 11, the display image is rotated on the center point of rotation M indicated by a double circle.

Thus, the display device of the foregoing arrangement automatically determines, in accordance with the length of each side of the display frame 201 and the length of each side of the part of the display image 202, the center point of rotation M of that part of the display image 202 which is displayed in the display section 10. This makes it possible to minimize a portion of the display image which portion is hidden by moving out of the display region when the display image has been rotated. Further, even in cases where a scaling operation causes a change in the size of the display image, the center point of rotation M is always determined automatically in accordance with the latest magnitude relation. This allows the user to carry out an optimum rotation process.

Embodiment 3

Figure 14:
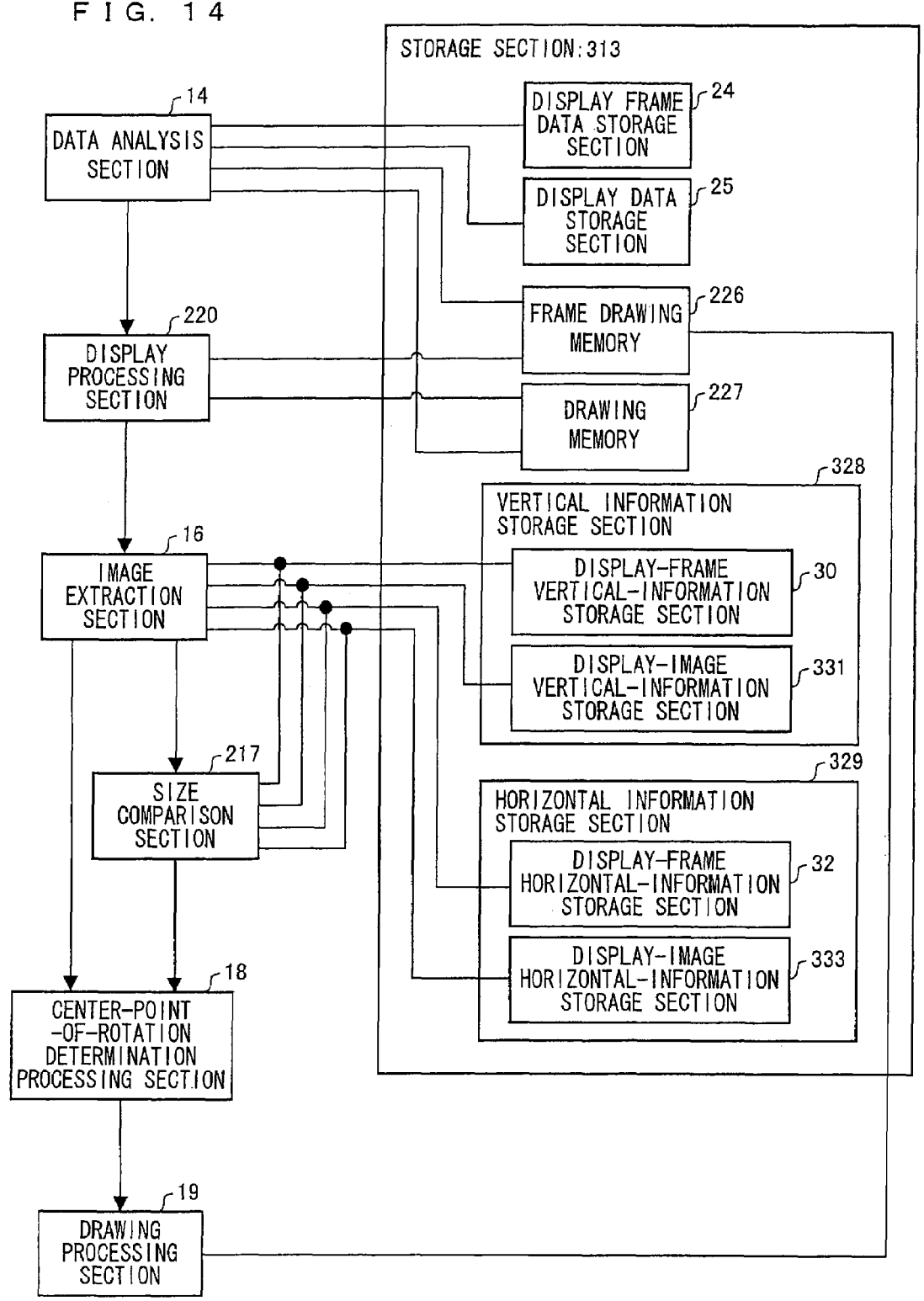
FIG. 14 is a block diagram showing a structure of a storage section of the image display device.

Another embodiment of the present invention will be described below with reference to the drawings. Components having the same functions as those described above in Embodiment 2 are given the same reference numerals, and a description thereof is omitted. A display device 3 according to the present embodiment is different in arrangement from the display device 2, shown in Embodiment 2, in terms of the display control section 212. The display device 3 according to the present embodiment is arranged so that the user can select a method for determining a center point. Further, as shown in FIG. 14, the display device 3 according to the present embodiment is different in arrangement from the display device 2, shown in Embodiment 2, in terms of the storage section 213. Specifically, in a storage section 313 of the display device 3 according to the present embodiment, the partial display-image vertical-information storage section 231 and the partial display-image horizontal-information storage section 233 both provided in the storage section 213 are replaced by a display-image vertical-information storage section 331 and a display-image horizontal-information storage section 333, respectively.

A display control section 312 of the present embodiment is arranged by adding, to Embodiment 2 described above, a section 321 for selecting a method for determining a center point of rotation (the section 321 being hereinafter referred to as "selection section 321").

The selection section 321 selects a method for determining a center point of rotation M. The display device 3 includes inputs A, B, and C as options for determining a center point of rotation M. One of the options is selected in accordance with the user's selection. In cases where the user selects the input A, the center-point-of-rotation determination processing section 18 functions as first center-of-rotation determination means. Further, in cases where the user selects the input B, the center-point-of-rotation determination processing section 18 functions as second center-of-rotation determination means. Furthermore, in cases where the user selects the input C, the center-point-of-rotation determination processing section 18 functions as third center-of-rotation determination means.

The selection of the input A by the user causes the selection section 321 to determine the center of a display image 302 as a center point of rotation M. That is, the selection section 321 determines a center point of rotation M by the first center-of-rotation determination means. Moreover, the display device 3 rotates the display image 302 on the center point of rotation M.

Further, the selection of the input B by the user causes the selection section 321 to determine the center of a display frame 301 as a center point of rotation M. That is, the selection section 321 determines a center point of rotation M by the second center-of-rotation determination means. Moreover, the display device 3 rotates the display image 302 on the center point of rotation M.

Furthermore, the selection of the input C by the user causes the selection section 321 to automatically determine a center point of rotation M with the use of the method by which the center point of rotation M is determined in Embodiment 2. That is, the selection section 321 determines a center point of rotation M by the third center-of-rotation determination means. Moreover, the display device 3 rotates the display image 302 on the center point of rotation M.

This allows the user to select a method for determining a center point of rotation M.

In the display-image vertical-information storage section 331, vertical information of image data 307 of the display image 302 is stored.

In the display-image horizontal-information storage section 333, horizontal information of the image data 307 of the display image 302 is stored.

[Process Procedures]

Figure 15:
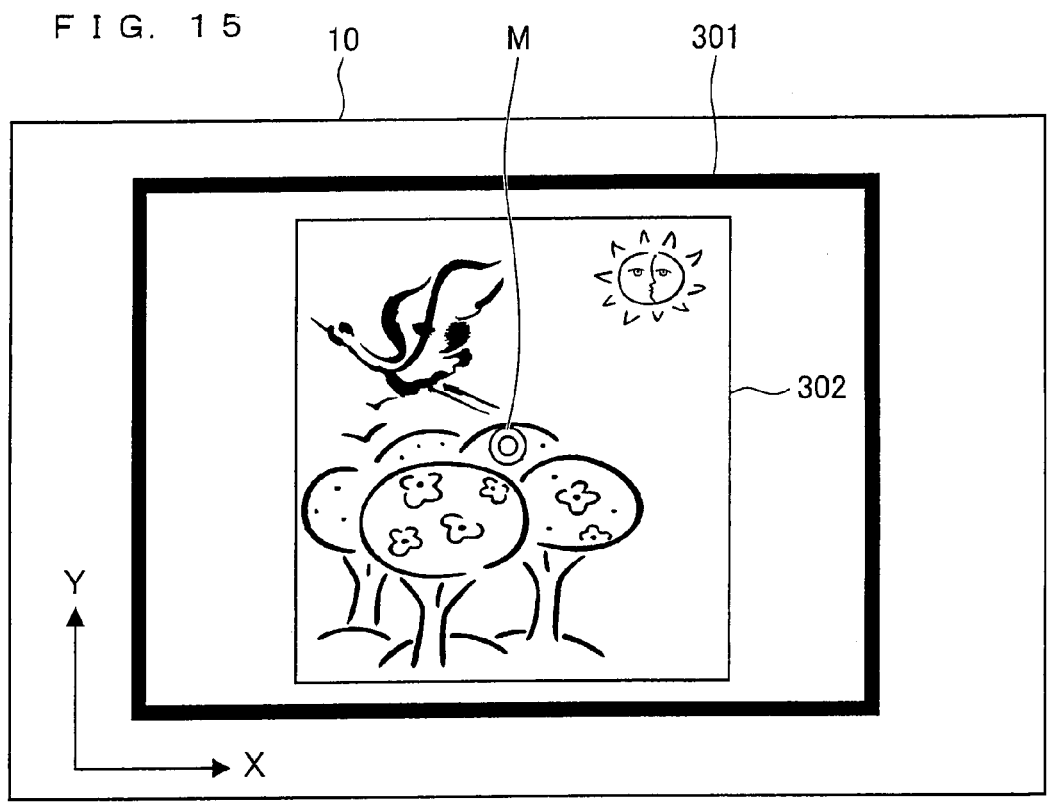
FIG. 15 is a diagram showing an example of a display section provided in the image display device in which a display image has not been rotated.

In the following, a flow of a process to be carried out in the display device 3 of the present embodiment is explained with reference to a flow chart shown in FIG. 15.

First, in S301, the data analysis section 14 takes display frame data 304 from the display frame data storage section 24, and converts the display frame data 304 into frame data 306. Then, the data analysis section 14 stores the frame data 306 in the frame drawing memory 226. Further, the data analysis section 14 takes display data 305 from the display data storage section 25, and converts the display data 305 into image data 307. Then, the data analysis section 14 stores the image data 307 in the drawing memory 227. Thereafter, the process shifts to S302.

In S302, the display processing section 220 takes the frame data 306 from the frame drawing memory 226, and transmits the frame data 306 to the display section 10. Further, the display processing section 220 takes the image data 307 from the drawing memory 227, and transmits the image data 307 to the display section 10. Thereafter, the process shifts to S303.

In S303, the image extraction section 16 extracts the frame data 306 and the image data 307 from the display section 10. Then, the image extraction section 16 stores vertical information of the frame data 306 in the display-frame vertical-information storage section 30 provided in a vertical information storage section 328, and stores horizontal information of the frame data 306 in the display-frame horizontal-information storage section 32 provided in a horizontal information storage section 329. Furthermore, the image extraction section 16 stores vertical information of the image data 307 in the display-image vertical-information storage section 331 provided in the vertical information storage section 328, and stores horizontal information of the image data 307 in the display-image horizontal-information storage section 333 provided in the horizontal information storage section 329. Thereafter, the process shifts to S304.

In S304, the selection section 321 is caused by the user to select a method for determining a center point of rotation M. Here, in cases where the user selects the input A, the process shifts to S305. Further, in cases where the user selects the input B, the process shifts to S306. Furthermore, in cases where the user selects the input C, the process shifts to S307.

In S305, i.e., in cases where the user has selected the input A, the selection section 321 determines the center of the display image 302 as a center point of rotation M. That is, the vertical calculation section 20 determines, as a Y coordinate of the center point of rotation M, a value half as great as the vertical length of the display image 302. Further, the horizontal calculation section 21 determines, as an X coordinate of the center point of rotation M, a value half as great as the horizontal length of the display image 302. Thereafter, the process shifts to S308.

Further, in S306, i.e., in cases where the user has selected the input B, the selection section 321 determines the center of the display frame 301 as a center point of rotation M. That is, the vertical calculation section 20 determines, as a Y coordinate of the center point of rotation M, a value half as great as the vertical length of the display frame 301. Further, the horizontal calculation section 21 determines, as an X coordinate of the center point of rotation M, a value half as great as the horizontal length of the display frame 301. Thereafter, the process shifts to S310.

Furthermore, in S307, i.e., in cases where the user has selected the input C, the selection section 321 automatically determines a center point of rotation M with the use of the method by which the center point of rotation M is determined in Embodiment 2. That is; in cases where the user has selected the input C, S407 and steps subsequent to S407 respectively identical to S204 and the steps subsequent to S204 are carried out. However, whereas the vertical and horizontal lengths of the part of the display image 202 serve as targets of comparison in Embodiment 2, the vertical and horizontal lengths of the display image 302 serve as targets of comparison in Embodiment 3.

In S308, the image rotation processing section 22 determines the center point of rotation M by using the value of the Y coordinate which value has been calculated by the vertical calculation section 20 and the value the X coordinate which value has been calculated by the horizontal calculation section 21. Then, the image rotation processing section 22 generates image data 308 in which the display image 302 has been rotated on the center point of rotation M. Thereafter, the process shifts to S309.

Figure 16:
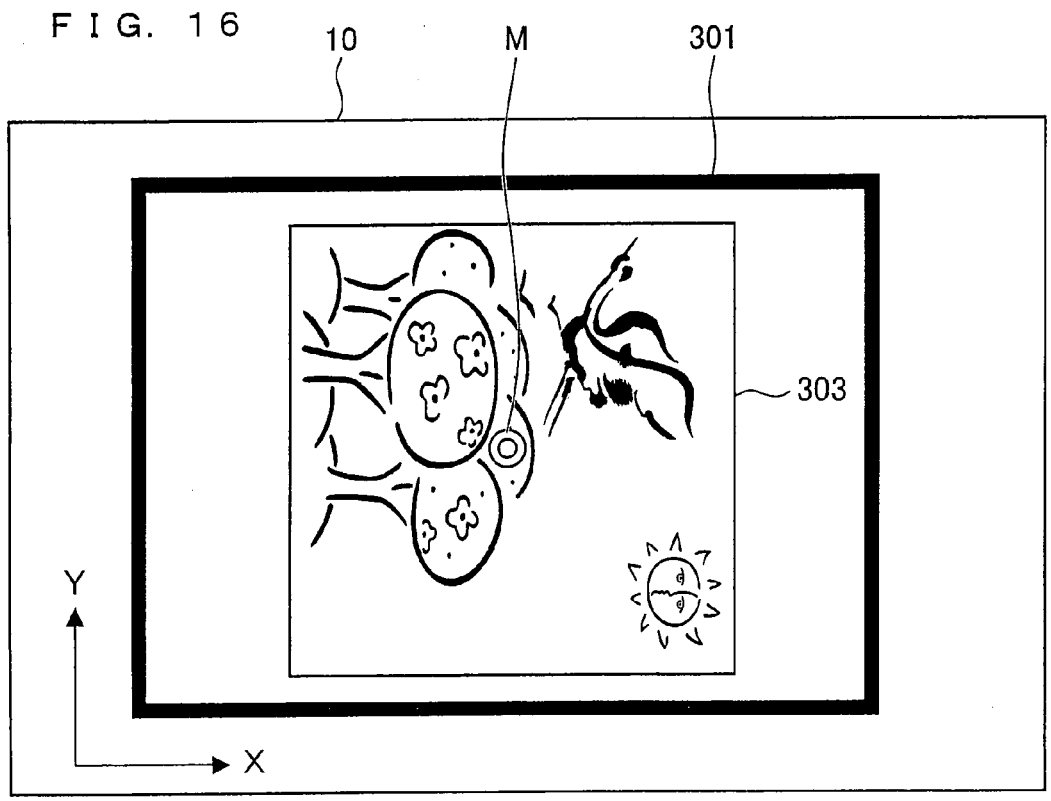
FIG. 16 is a diagram showing an example of a display section provided in the image display device in which a display image has been rotated.
Figure 17:
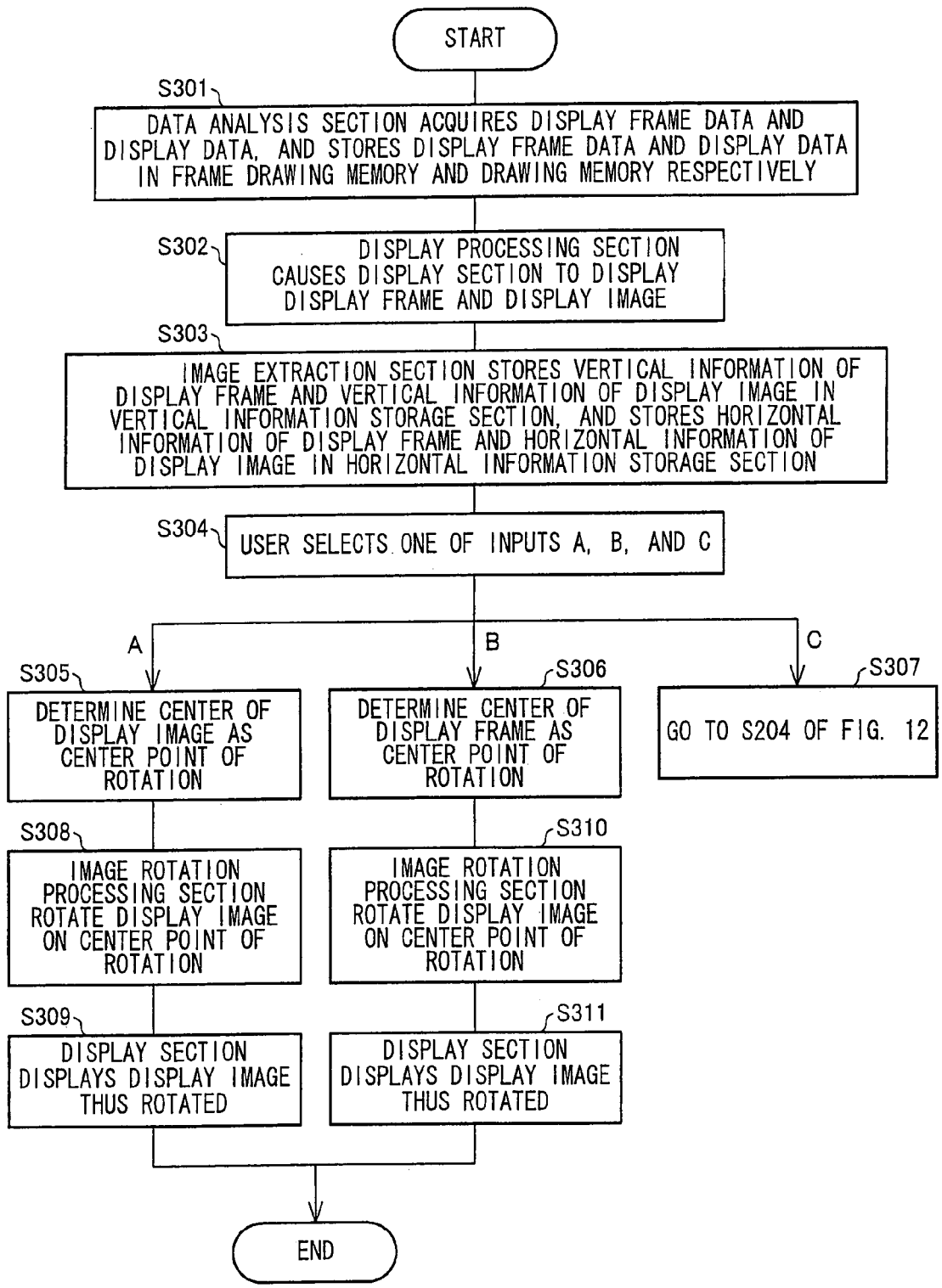
FIG. 17 is a flow chart showing a flow of a display process according to Embodiment 3.

In S309, as shown for example in FIG. 16, the output processing section 23 transmits, to the display section 10, the image data 308 thus generated after the rotation.

In S310, the image rotation processing section 22 determines the center point of rotation M by using the value of the Y coordinate which value has been calculated by the vertical calculation section 20 and the value the X coordinate which value has been calculated by the horizontal calculation section 21. Then, the image rotation processing section 22 generates image data 308 in which the display image 302 has been rotated on the center point of rotation M. Thereafter, the process shifts to S311.

In S311, as shown for example in FIG. 16, the output processing section 23 transmits, to the display section 10, the image data 308 thus generated after the rotation. With this, as shown for example in FIGS. 15 and 16, the display image is rotated on the center point of rotation M indicated by a double circle.

Thus, the display device of the foregoing arrangement allows the user to select a method for determining a center point of rotation M. Therefore, even in cases where a scaling operation causes a change in the size of the display image, the center point of rotation M is always determined in accordance with the latest magnitude relation.

Further, in Embodiments 1, 2, and 3 described above, the center point of rotation M is a point of intersection between (i) a line extending perpendicularly from a middle point of the shorter one of the respective vertical lengths of the display frame 101 and the display image 102 and (ii) a line extending perpendicularly from a middle point of the shorter one of the respective horizontal lengths of the display frame 101 and the display image 102. However, the present invention is not limited to the above-described embodiments. That is, for example, the center point of rotation M may be a point of intersection between (a) a line extending perpendicularly from a given point of the shorter one of the respective vertical lengths of the display frame 101 and the display image 102 and (b) a line extending perpendicularly from a given point of the shorter one of the respective horizontal lengths of the display frame 101 and the display image 102. In other words, the center point of rotation M may be positioned anywhere in a region surrounded by four sides, two of which correspond to the shorter one of the respective vertical lengths of the display frame 101 and the display image 102, and the other two of which correspond to the shorter one of the respective horizontal lengths of the display frame 101 and the display image 102. This makes it possible to minimize a portion of the display image which portion is hidden by moving out of the display region when the display image has been rotated. It is preferable that the center point of rotation M should not be a point corresponding to the peak of the surrounded region. The reason for this is as follows: the setting of the center point of rotation M at a point corresponding to the peak of the surrounded region causes such a problem that a large portion of the display image is hidden by moving out of the display region when the display image has been rotated.

The present invention is not limited to the description of the embodiments above, but may be altered by a skilled person within the scope of the claims. An embodiment based on a proper combination of technical means disclosed in different embodiments is encompassed in the technical scope of the present invention.

Further, each of the embodiments explains a case where each of the members constituting the display device "is a functional block realized when calculating means such as a CPU executes a program code stored in a storage device such as a ROM or a RAM". However, each of the members constituting the display device may be realized by using hardware capable of the same process. Further, each of the members constituting the display device may be realized by using a combination of (i) hardware for performing part of processing and (ii) the calculating means for controlling the hardware and for executing the program code for performing the rest of the processing. Furthermore, among the members, even a member explained as hardware can be realized by using a combination of (i) hardware for performing part of processing and (ii) the calculating means for controlling the hardware and for executing the program code for performing the rest of the processing. Further, the calculating means may be made up of a single processor or the like. Alternatively, the calculating means may be made up of a plurality of processors or the like that are so connected to one another via buses or channels inside the apparatus as to execute the program code together. Further, among the members, the storage section 13 may be a storage device such as a memory.

A program such as (i) the program code which can be executed directly by the calculating means or (ii) a program that is data from which the program code can be generated by carrying out a process such as decompression (will be described later) is (a) distributed by storing this program (the program code or the data) in a storage medium, or (b) distributed by transmitting the program using communication means for transmitting the program via a wired or wireless communication path. Then the program is executed by the calculating means.

In the case of transmitting the program via the communication path, a signal string indicating the program is transmitted via transmission media constituting the communication path, that is, the signal string is transmitted from one transmission medium to another. In this way, the program is transmitted via the communication path. Further, when transmitting the signal string indicating the program, the signal string may be superimposed on a carrier wave by causing the transmitting apparatus to modulate the carrier wave with the use of the signal string. In this case, the receiving apparatus demodulates the carrier wave so as to restore the signal string. On the other hand, when transmitting the signal string, the transmitting apparatus may (i) divide the signal string that is a digital data string into packets and (ii) transmit the packets. In this case, the receiving apparatus links received packets with each other so as to restore the signal string. Further, when transmitting the signal string, the transmitting apparatus may (i) combine the signal string with another signal string using a method such as time division, frequency division, or code division, and (ii) transmit the combined signal string. In this case, the receiving apparatus extracts the individual signal strings from the combined signal string so as to restore the signal strings. In either case, the same effect can be obtained as long as the program is transmitted via the communication path.

Here, the storage medium used for distributing the program is preferably detachable. However, a storage medium used for storing the distributed program may or may not be detachable. Further, as long as the storage medium stores the program, the storage medium may or may not be rewritable (writable) or volatile. Furthermore, the storage medium may store the program in any manner, and may have any shape. Examples of the storage medium are: (i) tapes such as a magnetic tape and a cassette tape; (ii) magnetic disks such as a Floppy® disk and a hard disk; (iii) disks such as a CD-ROM, a magnetic optical disk (MO), a mini disk (MD), and a digital video disk (DVD); (iv) cards such as an IC card and an optical card; (v) semiconductor memories such as a mask ROM, an EPROM, an EEPROM, and a flash ROM; and (vi) a memory provided in calculating means such as a CPU.

The program code may be a code for instructing the calculating means to carry out all steps of each of the foregoing processes. Alternatively, if there already exists a basic program (e.g., an operating system or a library) which can be started up in a predetermined manner and execute all or part of the steps, all or part of the steps may be substituted with the use of a code or pointer for instructing the calculating means to start up the basic program.

In addition, the program storage format of the storage medium may be, for example, such that: the calculating means can access the program for an execution as in an actual memory having loaded the program; the program is not loaded into an actual memory, but installed in a local storage medium (for example, an actual memory or hard disk) always accessible to the calculating means; or the program is stored before installing in a local storage medium from a network or a mobile storage medium. In addition, the program is not limited to compiled object code. The program may be stored as source code or intermediate code generated in the course of interpretation or compilation. In any case, the similar effects are obtained regardless of the format in which the storage medium stores the program, provided that decompression of compressed information, decoding of encoded information, interpretation, compilation, links, or loading to a memory or combinations of these processes can convert into a format executable by the calculating means.

Furthermore, the image display device according to the present invention is preferably arranged such that the determination means selects a shorter one of the vertical lengths and a shorter one of the horizontal lengths in accordance with the result of the comparison made by the comparison means, and determines, as the center point of rotation, a point of intersection between (i) a line extending perpendicularly from a given point of one of the two sides thus selected and (ii) a line extending perpendicularly from a given point of the other one of the two sides thus selected.

In this case, the center point of rotation is a point positioned within a region surrounded by four sides, two of which correspond to the shorter one of the respective vertical lengths of the outer edge of the display region and the display image, and the other two of which correspond to the shorter one of the respective horizontal lengths of the outer edge of the display region and the display image. This makes it possible to minimize a portion of the display image which portion is hidden by moving out of the display region when the display image has been rotated.

The image display device according to the present invention is preferably arranged so as to further include: a storage section in which the display image is stored; and display processing means for causing part of the display image, stored in the storage section, to be displayed in the display region.

In this case, the center point of rotation is a point positioned within a region surrounded by four sides, two of which correspond to the shorter one of the respective vertical lengths of the outer edge of the display region and the part of the display image, and the other two of which correspond to the shorter one of the respective horizontal lengths of the outer edge of the display region and the part of the display image. This makes it possible to minimize a portion of the display image which portion is hidden by moving out of the display region when the display image has been rotated.

The image display device according to the present invention is preferably arranged so as to further include: a storage section in which the display image is stored; first center-of-rotation determination means for determining, as the center point of rotation, a center of the display image displayed in the display region and stored in the storage section; second center-of-rotation determination means for determining, as the center point of rotation, a point of intersection between (i) a line extending perpendicularly from a middle point of a vertical side of the outer edge of the display region and (ii) a line extending perpendicularly from a middle point of a horizontal side of the outer edge of the display region; third center-of-rotation determination means for selecting a shorter one of the vertical lengths and a shorter one of the horizontal lengths in accordance with the result of the comparison made by the comparison means (a) between the respective vertical lengths of the outer edge of the display region in which the display image is displayed and the display image stored in the storage section and (b) between the respective horizontal lengths of the outer edge of the display region in which the display image is displayed and the display image stored in the storage section, and then determining, as the center point of rotation, a point of intersection between (1) a line extending perpendicularly from a given point of one of the two sides thus selected and (2) a line extending perpendicularly from a given point of the other one of the two sides thus selected; and selection means for selecting any one of the first to third center-of-rotation determination means.

In this case, the user is allowed to select one of the three means for determining the center point of rotation. Therefore, even in cases where a scaling operation causes a change in the size of the display image, the center point of rotation can be always determined in accordance with the latest magnitude relation.

The image display device according to the present invention is preferably arranged such that the determination means determines, as the center point of rotation, a point on a line extending perpendicularly from a middle point of either of the two sides thus selected.

In this case, the center point of rotation is a point falling on a line extending perpendicularly from a middle point of either of the sides. This makes it possible to minimize a portion of the display image which portion is to be hidden by moving out of the display region when the display image has been rotated.

The image display device according to the present invention is preferably arranged such that the determination means determines, as the center point of rotation, a point of intersection between (i) a line extending perpendicularly from a middle point of one of the two sides thus selected and (ii) a line extending perpendicularly from a middle point of the other one of the two sides thus selected.

In this case, the center point of rotation is a point of intersection between (i) a line extending perpendicularly from a middle point of one of the two sides thus selected and (ii) a line extending perpendicularly from a middle point of the other one of the two sides thus selected. This makes it possible to minimize a portion of the display image which portion is to be hidden by moving out of the display region when the display image has been rotated.

Further, the image display device according to the present invention is preferably arranged so as to further include: scaling up/down means for scaling up or down the display image, wherein the comparison means makes a comparison (i) between a vertical length of the display image scaled up or down by the scaling up/down means and a vertical length of the outer edge of the display region in which the display image is displayed and (ii) between a horizontal length of the display image scaled up or down by the scaling up/down means and a horizontal length of the outer edge of the display region in which the display image is displayed.

Therefore, even in cases where a scaling operation causes a change in the size of the display image, the center point of rotation can be always determined in accordance with the latest magnitude relation.

Incidentally, the image display device may be realized by using hardware, or may be realized by causing a computer to execute a program. For example, a program according to the present invention is a program for operating a computer as display control means. Moreover, the program is recorded in a storage medium according to the present invention.

The execution of these programs by a computer cause the computer to operate as the image display device. Therefore, as with the image display device, a rotation operation and a scaling operation can be carried out.

Specifically, an image display program according to the present invention only needs to be a program for causing a computer to execute: a comparison step of making a comparison (i) between a vertical length of an outer edge of a display region in which the display image is displayed and a vertical length of the display image and (ii) between a horizontal length of the outer edge of the display region in which the display image is displayed and a horizontal length of the display image; and a determination step of selecting a shorter one of the vertical lengths and a shorter one of the horizontal lengths in accordance with a result of the comparison made in the comparison step, and of determining, as a center point of rotation, a point of intersection between (a) a line extending perpendicularly from a given point of one of the two sides thus selected and (b) a line extending perpendicularly from a given point of the other one of the two sides thus selected.

Further, the image display program may be stored in a computer-readable storage medium.

As described above, an image display device according to the present invention includes: comparison means for making a comparison (i) between a vertical length of an outer edge of a display region in which the display image is displayed and a vertical length of the display image and (ii) between a horizontal length of the outer edge of the display region in which the display image is displayed and a horizontal length of the display image; and determination means for determining a center point of rotation of the display image in accordance with a result of the comparison made by the comparison means. Therefore, an effect of minimizing a portion of the display image which portion is hidden by moving out of the display region when the display image has been rotated is obtained with a simple arrangement.

INDUSTRIAL APPLICABILITY

An image display device according to the present invention can be applied, for example, to a display device, such as a portable phone, which does not have a large display region.

The invention claimed is:

1. An image display device having a function of rotating a display image around a center point of rotation, the image display device, comprising:
 a comparison unit for making a comparison (i) between a vertical length of an outer edge of a display region in which the display image is displayed and a vertical length of the display image and (ii) between a horizontal length of the outer edge of the display region in which the display image is displayed and a horizontal length of the display image;
 a storage unit in which the display image is stored;
 a first center-of-rotation determination unit for determining, as the center point of rotation, a center of the display image displayed in the display region and stored in the storage unit;
 a second center-of-rotation determination unit for determining, as the center point of rotation, a point of intersection between (i) a line extending perpendicularly from a middle point of a vertical side of the outer edge of the display region and (ii) a line extending perpendicularly from a middle point of a horizontal side of the outer edge of the display region;
 a third center-of-rotation determination unit for selecting a shorter one of the vertical lengths and a shorter one of the horizontal lengths in accordance with a result of the comparison made by the comparison unit (a) between the respective vertical lengths of the outer edge of the display region in which the display image is displayed and the display image stored in the storage unit and (b) between the respective horizontal lengths of the outer edge of the display region in which the display image is displayed and the display image stored in the storage unit, and then determining, as the center point of rotation, a point of intersection between (1) a line extending perpendicularly from a given point of one of the two sides thus selected and (2) a line extending perpendicularly from a given point of the other one of the two sides thus selected; and
 a selection unit for selecting any one of the first to third center-of-rotation determination units.

2. The image display device as set forth in claim 1, further comprising:
 display processing unit for causing part of the display image, stored in the storage unit, to be displayed in the display region, wherein:
 the comparison unit makes a comparison (i) between a vertical length of the part of the display image stored in the storage unit by the display processing unit and a vertical length of the outer edge of the display region in which the display image is displayed and (ii) between a horizontal length of the part of the display image stored in the storage unit by the display processing unit and a horizontal length of the outer edge of the display region in which the display image is displayed.

3. The image display device as set forth in claim 1, wherein the third center-of-rotation determination unit determines, as the center point of rotation, a point on a line extending perpendicularly from a middle point of either of the two sides thus selected.

4. The image display device as set forth in claim 1 wherein the third center-of-rotation determination unit determines, as the center point of rotation, a point of intersection between (i) a line extending perpendicularly from a middle point of one of the two sides thus selected and (ii) a line extending perpendicularly from a middle point of the other one of the two sides thus selected.

5. The image display device as set forth in claim 1, further comprising:
 a scaling up/down unit for scaling up or down the display image, wherein
 the comparison unit makes a comparison (i) between a vertical length of the display image scaled up or down by the scaling up/down unit and a vertical length of the outer edge of the display region in which the display image is displayed and (ii) between a horizontal length of the display image scaled up or down by the scaling up/down unit and a horizontal length of the outer edge of the display region in which the display image is displayed.

6. An image display method for rotating, around a center point of on a display image being displayed by an image display device, the image display method, comprising:
 a comparison step of making a comparison (i) between a vertical length of an outer edge of a display region in which the display image is displayed and a vertical length of the display image and (ii) between a horizontal length of the outer edge of the display region in which the display image is displayed and a horizontal length of the display image;
 a first center-of-rotation determination step of obtaining the display image from a storage unit in which the display image is stored and then determining, as the center point of rotation, a center of the display image obtained from the storage unit;
 a second center-of-rotation determination step of determining, as the center point of rotation, a point of intersection between (i) a line extending perpendicularly from a middle point of a vertical side of the outer edge of the display region and (ii) a line extending perpendicularly from a middle point of a horizontal side of the outer edge of the display region;
 a third center-of-rotation determination step of selecting a shorter one of the vertical lengths and a shorter one of the horizontal lengths in accordance with a result of the comparison made by the comparison unit (a) between the respective vertical lengths of the outer edge of the display region in which the display image is displayed and the display image stored in the storage unit and (1) between the respective horizontal lengths of the outer edge of the display region in which the display image is displayed and the display image stored in the storage unit, and then determining, as the center point of rotation, a point of intersection between (1) a line extending perpendicularly from a given point of one of the two sides thus selected and (2) a line extending perpendicularly from a given point of the other one of the two sides thus selected; and
 a selection step of selecting the center point of rotation determined by any one of the first to third center-of-rotation determination steps.

7. A computer-readable storage medium having stored thereon an image display computer executable program, the computer executable program when executed causes a computer system to execute:
- a comparison step of making a comparison (i) between a vertical length of an outer edge of a display region in which the display image is displayed and a vertical length of the display image and (ii) between a horizontal length of the outer edge of the display region in which the display image is displayed and a horizontal length of the display image; and
- a first center-of-rotation determination step of obtaining the display image from a storage unit in which the display image is stored and then determining, as a center point of rotation, a center of the display image obtained from the storage unit;
- a second center-of-rotation determination step of determining, as the center point of rotation, a point of intersection between (i) a line extending perpendicularly from a middle point of a vertical side of the outer edge of the display region and (ii) a line extending perpendicularly from a middle point of a horizontal side of the outer edge of the display region;
- a third center-of-rotation determination step of selecting a shorter one of the vertical lengths and a shorter one of the horizontal lengths in accordance with a result of the comparison made by the comparison unit (a) between the respective vertical lengths of the outer edge of the display region in which the display image is displayed and the display image stored in the storage unit and (1) between the respective horizontal lengths of the outer edge of the display region in which the display image is displayed and the display image stored in the storage unit, and then determining, as the center point of rotation, a point of intersection between (1) a line extending perpendicularly from a given point of one of the two sides thus selected and (2) a line extending perpendicularly from a given point of the other one of the two sides thus selected; and
- a selection step of selecting the center point of rotation determined by any one of the first to third center-of-rotation determination steps.

* * * * *